US006587687B1

(12) United States Patent
Wiedeman

(10) Patent No.: US 6,587,687 B1
(45) Date of Patent: Jul. 1, 2003

(54) MULTIPLE SATELLITE FADE ATTENUATION CONTROL SYSTEM

(75) Inventor: Robert A. Wiedeman, Los Altos, CA (US)

(73) Assignee: Globalstar L.P., San Jose, CA (US)

( * ) Notice: Subject to any disclaimer, the term of this patent is extended or adjusted under 35 U.S.C. 154(b) by 1045 days.

(21) Appl. No.: 08/734,507

(22) Filed: Oct. 21, 1996

(51) Int. Cl.[7] ................................................ H04Q 7/20
(52) U.S. Cl. ....................................... 455/428; 455/452
(58) Field of Search ................................. 455/427, 428, 455/429, 446, 449, 450, 452, 8, 10, 12.1, 13.1, 13.4, 504, 505, 63, 67.6, 67.3

(56) References Cited

U.S. PATENT DOCUMENTS

| | | | |
|---|---|---|---|
| 4,567,485 A | 1/1986 | Oshima et al. ............. 343/358 |
| 4,752,925 A | 6/1988 | Thompson et al. ......... 370/104 |
| 4,752,967 A | 6/1988 | Bustamante et al. ......... 455/12 |
| RE32,905 E | 4/1989 | Baran ......................... 370/104 |
| 4,901,307 A | 2/1990 | Gilhousen et al. ............ 370/18 |
| 4,910,792 A | 3/1990 | Takahata et al. .............. 455/10 |
| 5,010,317 A | 4/1991 | Schwendeman et al. . 340/311.1 |
| 5,073,900 A | 12/1991 | Mallinckrodt ................... 375/1 |
| 5,081,703 A | 1/1992 | Lee .............................. 455/13 |
| 5,095,500 A * | 3/1992 | Tayloe et al. ............... 455/446 |
| 5,109,390 A | 4/1992 | Gilhousen et al. ............. 375/1 |
| 5,119,225 A | 6/1992 | Grant et al. ................. 359/172 |
| 5,126,748 A | 6/1992 | Ames et al. ................. 342/353 |
| 5,138,631 A | 8/1992 | Taylor ............................ 375/1 |
| 5,216,427 A | 6/1993 | Yan et al. .................... 342/352 |
| 5,233,626 A | 8/1993 | Ames ............................. 375/1 |
| 5,239,671 A | 8/1993 | Linquist et al. ............ 455/13.1 |
| 5,265,119 A | 11/1993 | Gilhousen et al. ............. 375/1 |
| 5,285,208 A | 2/1994 | Bertiger et al. ............. 342/352 |

(List continued on next page.)

FOREIGN PATENT DOCUMENTS

| | | | |
|---|---|---|---|
| EP | 0 421 698 A3 | 10/1991 | |
| EP | 0 652 649 | 5/1995 | .......... H04B/7/185 |
| WO | WO 90/13186 | 11/1990 | |
| WO | WO 91/09473 | 6/1991 | |
| WO | WO 93/09613 | 5/1993 | |
| WO | WO 93 15591 | 8/1993 | |

OTHER PUBLICATIONS

US 5,415,368, 5/1995, Horstein et al. (withdrawn)
Petition of American Mobile Satellite Corporation Beford the FCC, Washington, DC 20554, dated Jun. 3, 1991, pp 1–15.

(List continued on next page.)

*Primary Examiner*—Thanh Cong Le
*Assistant Examiner*—Nick Corsaro
(74) *Attorney, Agent, or Firm*—Ohlandt, Greeley, Ruggerio & Perle, L.L.P.

(57) ABSTRACT

The teaching of this invention pertains particularly to satellite communications systems using GSO or NGSO satellites. This invention employs data derived from signals of various types to derive a mathematical model of propagation related attenuation-inducing events so as to plan system resource allocation to minimize an amount of power required to close communication links between user terminals and the satellites. Disclosed are methods for modelling gateway to satellite links, as well as methods for modeling the user terminal to satellite links. This invention overcomes the problems inherent in the prior art by providing a direct measurement of severe path attenuation potential. The use of the teaching of this invention enables preplanning of the allocation of satellites and satellite resources by calculating a potential for signal path interference based on an external measurement of where rain attenuation may be located, and the real-time or approximately real-time tracking of rain cell activity within storm cells. Optimization of a global system of satellites is made possible, particularly in the context of a system of LEO satellites.

29 Claims, 21 Drawing Sheets

U.S. PATENT DOCUMENTS

| | | | |
|---|---|---|---|
| 5,303,286 A | | 4/1994 | Wiedeman .................... 379/59 |
| 5,339,330 A | | 8/1994 | Mallinckrodt .................. 375/1 |
| 5,410,728 A | | 4/1995 | Bertiger et al. ............ 455/13.1 |
| 5,422,647 A | | 6/1995 | Hirshfield et al. .......... 342/354 |
| 5,433,726 A | | 7/1995 | Horstein et al. ........ 244/158 R |
| 5,439,190 A | | 8/1995 | Horstein et al. ............ 244/158 |
| 5,446,756 A | | 8/1995 | Mallinckrodt ............... 375/200 |
| 5,448,623 A | | 9/1995 | Wiedeman et al. ........... 379/59 |
| 5,511,233 A | | 4/1996 | Otten ........................ 455/56.1 |
| 5,533,011 A | | 7/1996 | Dean et al. .................... 370/18 |
| 5,551,624 A | | 9/1996 | Horstein et al. ........ 244/158 R |
| 5,552,798 A | | 9/1996 | Dietrich et al. ............. 343/893 |
| 5,561,837 A | * | 10/1996 | Muller et al. .............. 455/13.1 |
| 5,590,395 A | | 12/1996 | Diekelman ................. 455/13.1 |
| 5,619,525 A | | 4/1997 | Wiedeman et al. ......... 375/200 |
| 5,669,063 A | * | 9/1997 | Brockel et al. ............. 455/506 |

OTHER PUBLICATIONS

Application of Motorola Satellite Communications, Inc. for IRIDIUM A Low Earth Orbit Mobile Satellite System before the FCC, Washington, D.C. Dec. 1990, pp. 49–96.

Before the FCC, Washington, D.C. 20554, ARIES CONSTELLATION Low Earth Orbit Satellite System Proposal of Constellation Communications, Inc. Jun. 3, 1991, Appendix A, B, and C.

Application of TRW Inc. for Authority to Construct a New Communications Satellite System Odyssey$^{sm}$ before the FCC, Washington, D.C. 20554, May 31, 1991 pp. 33–51.

Application of Ellipsat Corporation ELLIPSAT for the Authority to Construct ELLIPSO$^R$I An Elliptical Orbit Satellite System, before the FCC, Washington, D.C. 20554, Nov. 2, 1990, pp. 5–34.

Application of Loral Cellular Systems, Corp., Globalstar Mobile Communications Wherever You Are, before the FCC, Washington, D.C. Jun. 3, 1991, pp. 94–187.

"An Integrated Satellite–Cellular Land Mobile System for Europe", E. Del Re, University of Florence, Dept. of Electronics Engineering, italy, Sep. 21, 1989.

"Current and Future Mobile Satellite Communication Systems", S. Kato et al., IEICE Transactions, vol. E 74, No. 8 Aug. 1991, pp. 2201–2210.

"Digital Network Oriented Mobile Radio Satellite System as an Integrated Part of the GSM Cellular Radio System in Europe", P. Dondl, Deutsch BUndespost/Fernmeldetechniches Zentralmt/Darmstadt, Fed. Rep. Germ. Sep. 21, 1989.

"The OmniTRACS$^R$ Mobile Satellite Communicatons and Positioning System", E. Tiedemann, Jr. et al., Vehicle Electronics in the 90's: Proceedings of the In'l. Congress on Transporation Electronics, 10/90.

"Software Implementation of a PN Spread Spectrum Receiver to Accommodate Dynamics", C. Cahn et al., IEEE Trans. on Comm., vol. COM–25, No. 8, Aug. 1977.

"A Communication Technique for Multipath Channels", R. Price, Proceedings of the IR, Mar. 1958, pp. 555–570.

"Increased Capacity Using CDMA for Mobile Satellite Communication", K. Gilhousen et al., IEEE Journal on Selected Areas in Communications, vol. 8, No. 4, May 1990, pp. 503–514.

"The Iridium$^{TM1}$ System—A Revolutionary Satellite Communications System Developed with Innovative Applications of Technology", D. Sterling et al., IEEE, MILCOM 1991, Nov. 4–7.

"Iridium: Key to Worldwide Celluar Communications", J. Foley, Telecommunication, Oct. 1991, pp. 23–28.

*Joint On–Board Resource Sharing and Hierarchical Modulation Scheme for Satellite Communication* by M. Morimoto etal., Osaka University, Japan pp. 1662–1666 pub. Nov. 14, 1995.

*Fade Measurements at 20 GHz Using MAYAK and OLYMPUS Satellites*, by Ahmed et al., University of SUrrey, U.K. pub Nov. 2, 1993 pp. 269–274.

*Earth–Satellite Propagation Research* by F. Davarian in IEEE Communications Magazine, Apr. 1994 No. 4, pp. 74–79.

*Software Package for the Performance Evaluation of Satellite Communication Systems with Adaptive Allocation of On–Board Common Resources* by F. Barbaliscia et al., in IEEE Transactions on Communications, vol. 40, No. 6, Jun. 1992 pp. 1003–1005.

* cited by examiner

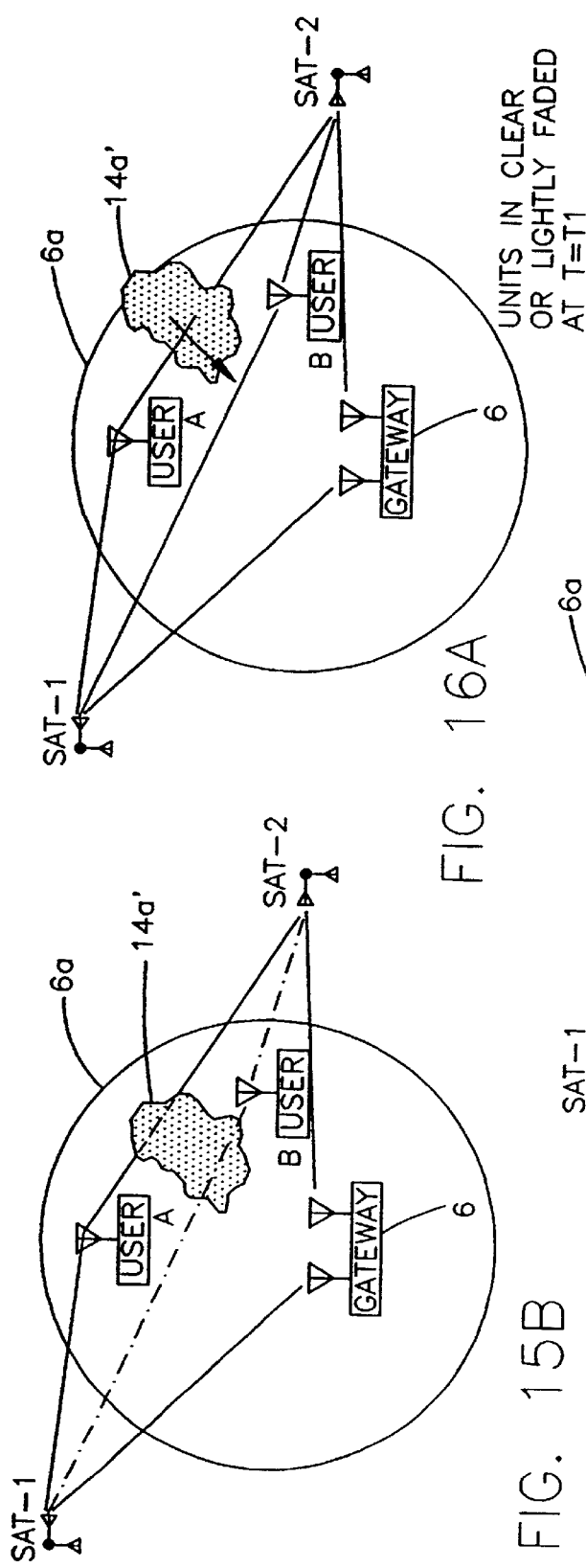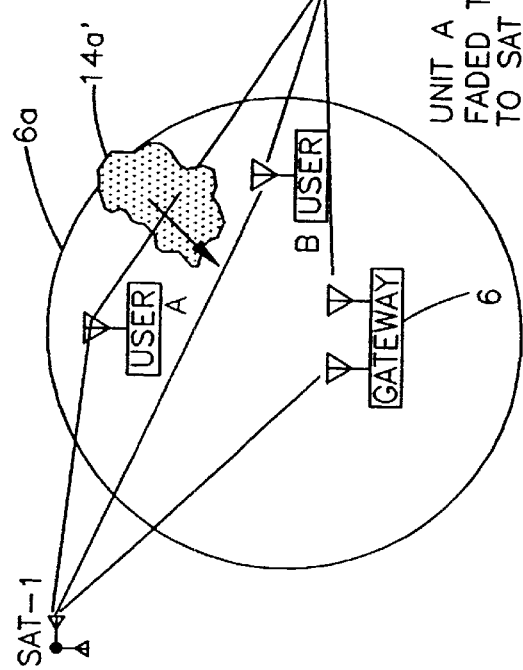

UNIT A IN CLEAR TO SAT 1 BUT FADED TO SAT 2
UNIT B IN CLEAR TO SAT 2 BUT FADED TO SAT 1
AT T=T3

UNIT A IN CLEAR TO SAT 1 AND SAT 2
UNIT B IN CLEAR TO SAT 2 BUT FADED TO SAT 1
AT T=T4

MULTIPLE SATELLITE FADE ATTENUATION CONTROL SYSTEM

FIELD OF THE INVENTION

This invention relates generally to satellite communications systems and, in particular, to RF transmission and power control techniques for use in a satellite communications system.

BACKGROUND OF THE INVENTION

Satellite telephone systems for fixed and mobile communications are emerging as a new global business. These systems utilize many individual circuits routed through one satellite or a constellation of many satellites to effect communications. The value of the satellite telephone system is that it provides ubiquitous coverage of large areas of the earth without the construction of many small terrestrial cells. Since the allocation of frequencies for satellite services, a number of proposals have been advanced for the deployment of satellite communications systems. In general, these proposals have involved either a Time Division Multiple Access (TDMA) technique or a Code Division Multiple Access (CDMA) technique.

The communications link availability for these services are a critical factor. In high frequency bands above 3 GHz, and especially above 10 GHz, it is important to avoid a large amount of margin in the signal strength in order to avoid oversizing the satellite design. Further it is important for some systems, such as CDMA systems, to maintain the signal at a fixed level as it arrives at the satellite. An important consideration then is the method selected for compensating for rain attenuation in the frequency bands above 3 GHz, and for other types of signal path impairments as well.

Referring to FIG. 1A, there is shown an arrangement for communication to several satellites 2 for a typical Teleport or Mobile Satellite Service (MSS) site 1. The site 1, also referred to as a gateway, is a typical multi-satellite teleport having antennas 1a in contact with several satellites 2, each of which is connected to one or more gateways or served entities. The multiple antennas 1a connected to a single gateway 1 may provide multiple satellite coverage, such as is proposed for Low Earth Orbit (LEO) Mobile Satellite Service (MSS) or Fixed Satellite Service (FSS).

FIG. 1B illustrates the same site 1 with the addition of a spatial diversity site 1b separated from the primary site by a distance D. In this approach the spatial diversity of antenna sites provides alternative signaling paths to a single one of the satellites 2. In the bands above 10 GHz, in order to maintain high levels of availability, it is conventional practice to place the redundant or diversity site 1b some 35 km to 100 km away from the primary site 1. By thus separating the sites the communications can be switched to the diversity site 1b when atmospheric attenuation, due, for example, to a presence of a rain cell near the primary site 1, exceeds a certain value at the primary site.

Alternatively, a second approach eliminates the diversity site 1b by placing the primary site 1 in a region, such as a desert, where rain is infrequent.

Neither of these approaches is satisfactory, and both incur large incremental costs. In the first approach there must be a duplication of hardware, real estate, and possibly personnel if the sites are manned. Also, some mechanism must be installed for linking the primary site 1 to the diversity site 1b (e.g., underground cables, microwave towers, etc.). The second approach requires the construction, provisioning, and maintenance of the site in a location which is either inconvenient or is not economically attractive (e.g., the site is too far from the PSTN connection, requiring long distance backhauls).

It can be realized that the communications capability is enhanced by selecting the communications path or paths with the lowest attenuation, or by combining lowest attenuation paths, while avoiding paths which are heavily attenuated. This approach maximizes communications signal strengths and reduces the amount of signal strength margin required. That is, instead of transmitting at a power level that is required to compensate for the heavily attenuated paths, and thus consuming a considerable amount of satellite power, a better approach is to avoid the heavily attenuated path or paths in favor of the less attenuated path or paths. In order to accomplish this technique it is necessary to make decisions based on observed amounts of path attenuation.

In previous systems known to the inventor such decisions were made based on received signal strength, at the gateway, of a signal transmitted from some source, generally located on the satellite or passed through the satellite. However, a disadvantage of this approach is that the attenuation information is only instantaneously known, thereby making impossible an ability to perform short term or long term planning of link allocation and power budgets.

Reference in regard to various satellite power control techniques can be had to the following U.S. Pat. No. 4,991,199, Saam, "Uplink Power Control Mechanism For Maintaining Constant Output Power From Satellite Transponder"; U.S. Pat. No. 4,752,967, Bustamante et al., "Power Control System For Satellite Communications"; U.S. Pat. No. 5,339,330, Mallinckrodt, "Integrated Cellular Communications System"; U.S. Pat. No. 4,752,925, Thompson et al., "Two-Hop Collocated Satellite Communications. System"; U.S. Pat. No. 5,126,748, Ames et al., "Dual Satellite Navigation System And Method"; U.S. Pat. No. 5,109,390, Gilhousen et al., "Diversity Receiver In A CDMA Cellular Telephone System"; and U.S. Pat. No. 5,138,631, Taylor, "Satellite Communication Network".

Reference can also be had to the improved power management technique disclosed in commonly assigned and allowed U.S. patent application Ser. No. 08/467,209, filing date: Jun. 6, 1995, entitled "Closed Loop Power Control For Low Earth Obrbit Satellite Communications System", by Robert A. Wiedeman and Michael J. Sites.

Reference may also be had, by example, to "Satellite Communications System Engineering", 2nd Edition, W. Pritchard et al., Prentice Hall, 1993, pages 273–294, for a discussion of various noise temperatures, propagation factors, and the use of a rain attenuation model in RF link design.

OBJECTS AND ADVANTAGES OF THE INVENTION

It is a first object of this invention to provide an improved satellite communication system and method for accurately determining the presence and amount of attenuation due to rain and other weather-related events.

It is a second object of this invention to provide an improved satellite communication system and method that employs a direct measurement of severe path attenuation potential, without requiring a signal source either transmitted from a satellite or passed through the satellite.

An advantage provided by the teaching of this invention is an ability to operate a satellite communications system so as to conserve system power.

A further advantage provided by the teaching of this invention is an ability to operate a satellite communications system so as to assign and allocate resources in accordance with a current model of RF signal path impairments between gateways, satellites, and user terminals, on a local or global scale.

SUMMARY OF THE INVENTION

The foregoing and other problems are overcome and the objects and advantages are realized by methods and apparatus in accordance with embodiments of this invention.

This invention pertains particularly to satellite communications systems using GSO or NGSO satellites. This invention employs data derived from signals of various types to derive a model of atmospheric-related attenuation-inducing events so as to plan system resource allocation to minimize an amount of power required to close communication links between user terminals and the satellites. Disclosed are methods for modelling gateway to satellite links, as well as methods for modeling the user terminal to satellite links.

This invention avoids the necessity to employ diversity antenna sites, but does not preclude the use of such sites, by modeling atmospheric disturbances in real time by measurement, by predicting the "best" path to use, and by directing the antennas at the site to utilize a least faded path and/or to select alternate paths to avoid significant fading. The use of the invention at a diversity antenna site improves system performance.

This invention overcomes the problems inherent in the prior art by providing a direct measurement of severe path attenuation potential, without requiring a signal source either transmitted from the satellite or passed through the satellite. The use of the teaching of this invention enables preplanning of the allocation of satellites and satellite resources by calculating a potential for signal path interference based on an external measurement of where rain attenuation may be located, and the real-time or approximately real-time tracking of rain cell activity within storm cells.

A method is disclosed, in accordance with this invention, for operating a satellite communications system of a type that includes a plurality of ground stations, a plurality of satellites, and a plurality of user terminals. The method includes the steps of, at a plurality of the gateways, generating a model of atmospheric-related attenuation-inducing structures and/or other propagation factors located within a coverage area of each of the gateways; transmitting data indicative of the generated model from each of the plurality of gateways to a gateway controller; and generating gateway commands at the gateway controller for preemptively allocating satellite communications system resources at least in accordance with the received data.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

Figure 2A:
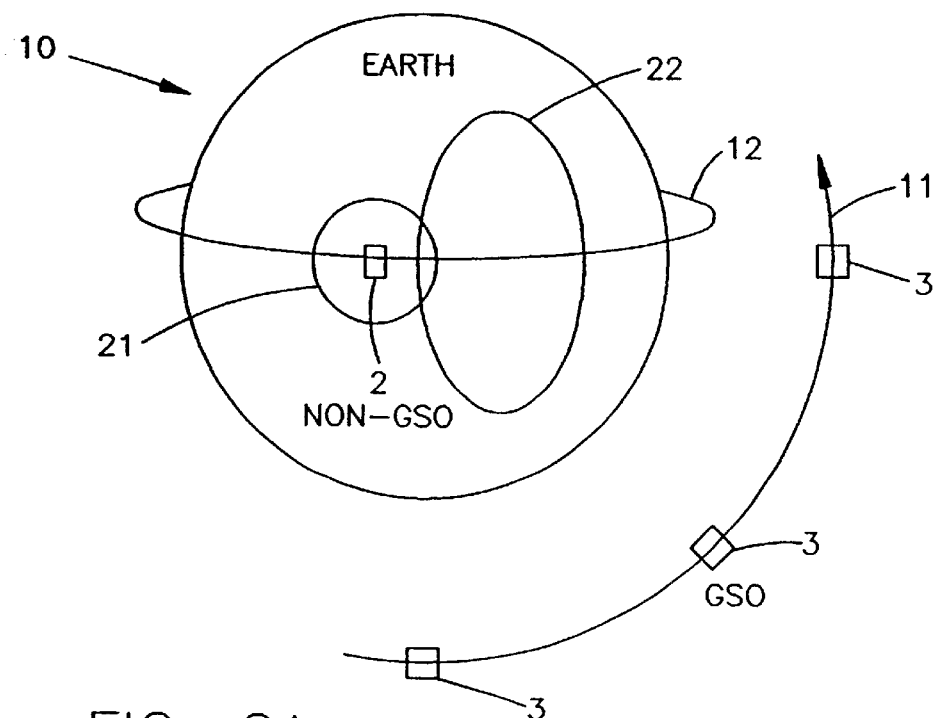
FIGS. 2A–2C illustrate relationships between various satellite constellations and their respective earth coverage areas.

Referring to FIG. 2A, and by way of introduction, in accordance with the teaching of this invention there is described a technique for anticipating and compensating for signal path impairments in either a NGSO satellite constellation, such as a low earth orbit (LEO) satellite constellation, or a higher orbit constellation (Medium Earth Orbit (MEO) and/or GSO constellation(s)), so as to improve the resistance to environmental attenuation, such as that caused by rain. The following U.S. Patents teach various aspects of a LEO satellite constellation, and the associated communication system: U.S. Pat. No. 5,552,798, issued Sep. 3, 1996, entitled "Antenna for Multipath Satellite Communication Links", by F. J. Dietrich and P. A. Monte; U.S. Pat. No. 5,422,647, issued Jun. 6, 1995, entitled "Mobile Communication Satellite Payload", by E. Hirshfield and C. A. Tsao; U.S. Pat. No. 5,504,493, issued Apr. 2, 1996, entitled "Active Transmit Phased Array Antenna with Amplitude Taper", by E. Hirshfield; U.S. Pat. Nos. 5,448,623, issued Sep. 5, 1995, and 5,526,404, issued Jun. 11, 1996, "Satellite Telecommunications System Using Network Coordinating Gateways Operative with a Terrestrial Communication System", by R. A. Wiedeman and P. A. Monte; U.S. Pat. No. 5,303,286, issued Apr. 12, 1994, entitled "Wireless Telephone/Satellite Roaming System", by R. A. Wiedeman;

and U.S. Pat. No. 5,233,626, issued Aug. 3, 1993, entitled "Repeater Diversity Spread Spectrum Communication System", by S. A. Ames. The disclosures of these U.S. Patents is incorporated by reference herein in their entireties.

Although this invention will be described below primarily in the context of rain attenuation, it should be realized that the teaching of this invention applies to other propagation effects as well. These effects can be, but are not limited to, gaseous atmospheric absorption, ionospheric scintillation, Faraday rotation, variable atmospheric refraction, and rain depolarization. In general, then, the teaching of this invention applies to RF signal attenuations induced by atmospheric-related effects, and to the modelling of such attenuation(s) and subsequent use of the model in compensating for the attenuation(s), in real or substantially real time, and/or in a predictive mode.

In a presently preferred embodiment of this invention the LEO (NGSO) satellite constellation includes satellites 2 at an altitude of ≈1400 km in eight circular planes offset by 45°, inclined at 52° relative to the equator with six satellites 10a in each plane (which may be referred to as a Walker constellation). To optimize the effectiveness of the coverage, path diversity is employed to mitigate against local obstructions such as trees, buildings, and mountains. Path diversity requires that a user terminal on the ground have a simultaneous view of two or more satellites at elevations above about 10° over the horizon. The LEO constellation described above provides multiple satellite coverage over a large portion of the earth's surface.

FIG. 2A illustrates a general configuration of a satellite communications system 10 in accordance with the teaching of this invention. The satellite communications system 10 includes a non-geosynchronous orbit (NGSO) satellite or a plurality of NGSO satellites 2, which may be referred to collectively as a satellite constellation. This constellation may be similar to that described in the U.S. Patents listed above as being incorporated by reference, although the teaching of this invention should not be read to be limited to only this particular type of LEO system. The NGSO satellites 2 orbit the earth in the non-geosynchronous orbit 12. It is not necessary that there be more than one satellite 2, however, the preferred configuration contains many satellites. Each satellite 2 has an associated earth coverage area 21. FIG. 2A also shows a geosynchronous (GSO) satellite constellation having one or more GSO satellites 3 which orbit the earth in a synchronous orbit 11. A synchronous orbit is one in which the satellites 3 do not have apparent movement with respect to points on the earth. A given GSO satellite 3 has an associated earth coverage area 22 which, because of the difference in altitude with respect to the non-GSO satellites 2, is significantly larger than the coverage area 21.

It should be noted that it is not necessary for the satellite 3 to be in a GSO orbit, but in fact may be non-synchronous as well. For example, the satellite 3 could be in a medium earth orbit (MEO). Also, there are typically more than one of the satellites. 3 for providing whole earth or near whole earth support for the NGSO satellites 2. However, in any case the satellites 3 are at a greater altitude than the satellites 2. The NGSO constellation or the GSO constellation, depending on which is used for a given satellite communication system, may be referred to as the space segment of the satellite communications system 10.

Operating power on a satellite is a valuable resource which must be controlled, since there is at any given time a finite amount of available power. In general, with the NGSO satellite system the power available from the constellation of satellites is directly proportional to a number of communications circuits that may be supported in the busiest or peak hour, as the peak hour progresses around the earth from time zone to time zone. As such, at any instant the satellites which are orbiting over an area can deliver a certain amount of communications circuits to the area depending on the state of the power system, the number of satellites covering the area, and the amount of spectrum available to be utilized. If it is assumed that the amount of spectrum is hot a limiting factor, then the number of available satellites and the available amount of power are the two dominant factors.

Figure 2F:
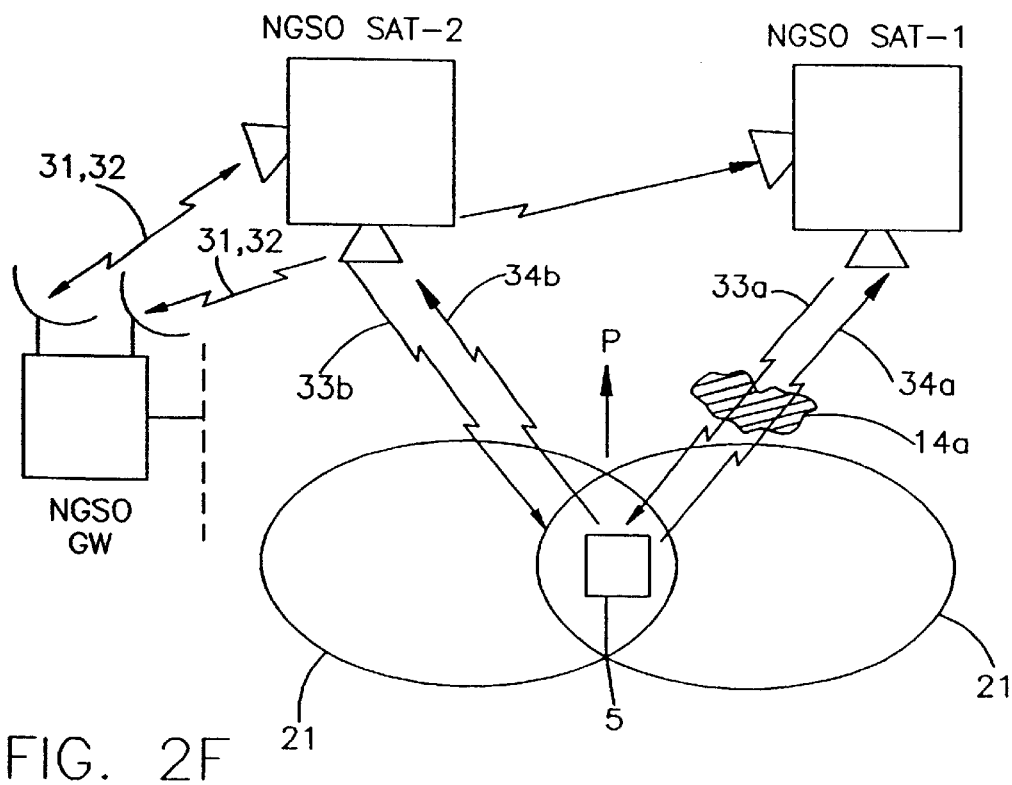
FIG. 2F illustrates the effect of a rain cell on communication links between the user terminal and one of a plurality of non-geosynchronous satellites.
Figure 2D:
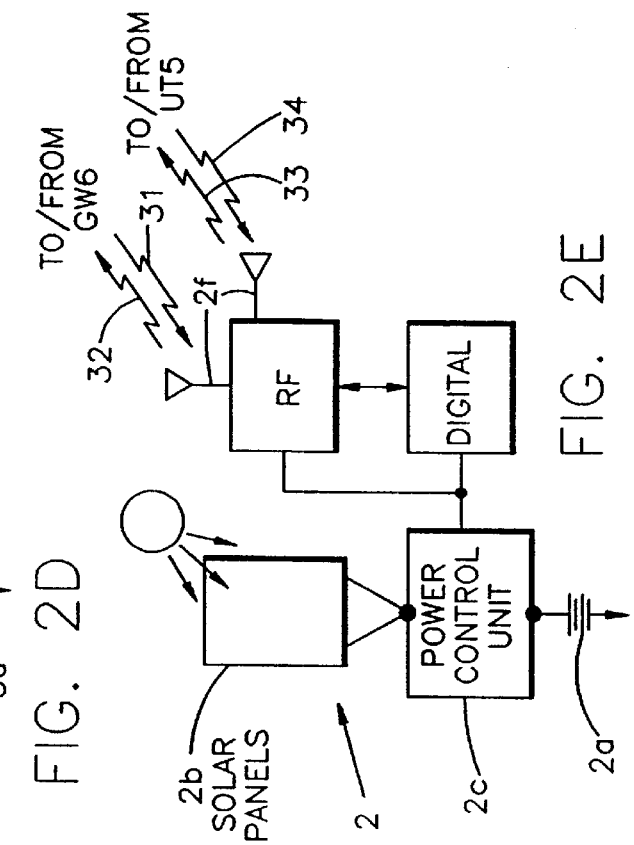
FIG. 2D is a simplified block diagram of a user terminal suitable for practicing this invention.
Figure 2E:
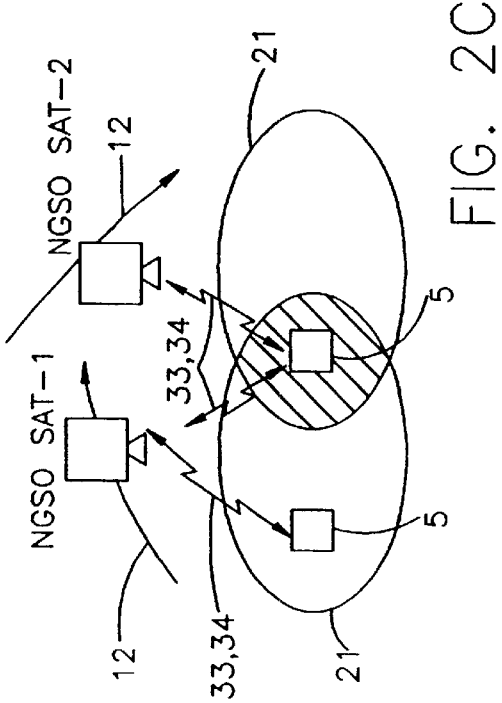
FIG. 2E is a simplified block diagram of a satellite suitable for practicing this invention.
Figure 2B:
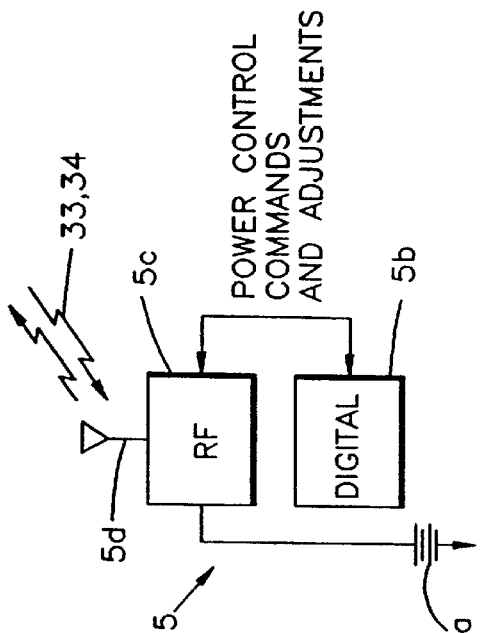
Figure 2C:
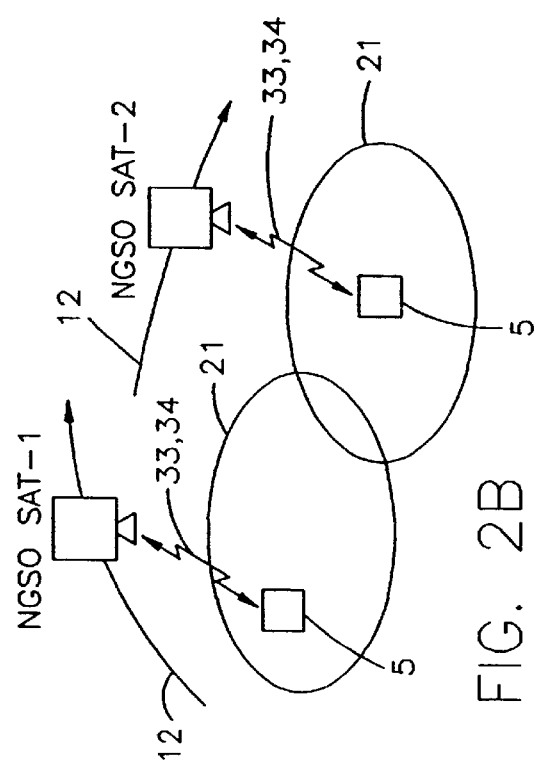

Reference is now made to FIGS. 2B and 2C for illustrating two different embodiments of NGSO systems. In constellation A (FIG. 2B), the coverage areas or regions 21 of the NGSO satellites 2 do not substantially overlap, any user terminals 5 within the coverage regions 21 do not compete for resources-from one NGSO satellite, and the power used is drawn from one satellite at a time for each user terminal. However, in constellation B (FIG. 2C), the coverage regions 21 substantially overlap one another, the user terminals 5 within the overlapping coverage zones compete for resources from two or more NGSO satellites 2, and power may be drawn from more than one satellite 2 at a time to support a single user terminal's communication links. For the configurations shown in FIGS. 2B and 2C the power cost of the links in both directions is important.

Referring briefly to FIG. 2D, the user terminal 5, in mobile and portable configurations, has a battery 5a which supplies power to a digital section 5b, including user terminal control processor, and an RF section 5c, comprised of a transmitter, a receiver, and related RF signal handling components. The function of these various sections is to enable a satellite uplink 34 and a satellite downlink 33 to be established and maintained, via antenna 5d, for transmitting and receiving voice and/or data communications.

Referring also to FIG. 2E, the NGSO satellite 2 has battery 2a which is charged from one or more solar panels 2b through a power control unit 2c. When the solar panels 2b are not providing power (during eclipse), the operating power for a digital section 2d and RF section 2e must be supplied from the battery 2a, via the power control unit 2c, to establish and maintain the gateway uplink 31, gateway downlink 32, and the user terminal links 33 and 34, through appropriate antennas 2f. For an embodiment that employs onboard signal processing of communication links and/or link powers, the digital section 2d is assumed to include a suitable digital data processor and any required support circuits, such as a memory, demodulators, modulators, etc.

In the case of both FIGS. 2D and 2E it is important to carefully control the amount of current drawn from the power system batteries 5a and 2a, and to also minimize the weight and size of the batteries and power systems. For the NGSO satellite 2, it is also important to minimize the weight and size of the solar panels 2b, since solar power generators are costly to build and launch. Since the cost of launching a satellite is a strong function of the weight that will be lifted, the available power in Watts and Watt-hours that can be obtained with reasonably sized batteries and solar panels determines, to a large degree, the financial viability of the satellite communications system.

In order to minimize the weight of the battery 5a of the user terminal 5 and to minimize the cost and weight of the satellite power system (2a–2c), it is useful to only transmit the minimum power necessary to close the RF links 33 and 34 to the user terminals 5. Since the links 33 and 34 are subject to various impairments, a variable amount of power is necessary to overcome the impairments. The specific nature of the impairments depends on the nature of the operation, the type of system modulation being transmitted, and the slant range between the user terminal 5 and the satellite(s) 2. It should be noted that in the NGSO satellite system the slant range is constantly varying as the satellites 2 move overhead. Some, but not all, of the various impairments that can be experienced include impairments due to foliage absorption and diffraction, impairments due to building blockage or other obstructions in any frequency band, and, of most interest to this invention, impairments due to rain attenuation in bands above about 3 GHz.

Furthermore, certain types of signal modulation operate most effectively if all user terminal transmissions are controlled to a certain level, independent of impairments, slant ranges, and other variations. One type of signal modulation that behaves in this manner is Spread Spectrum utilizing Code Division Multiple Access or (SS/CDMA). In SS/CDMA the system goal is to bring all user terminal 5 transmitted up-link signals 34 in a certain frequency channel to approximately the same power flux density as received at the satellite 2. The power control system to keep the user terminals 5 at the same or at the minimum power level, as received at the satellite, is independent of the modulation scheme, impairment, or frequency band chosen.

Figure 3:
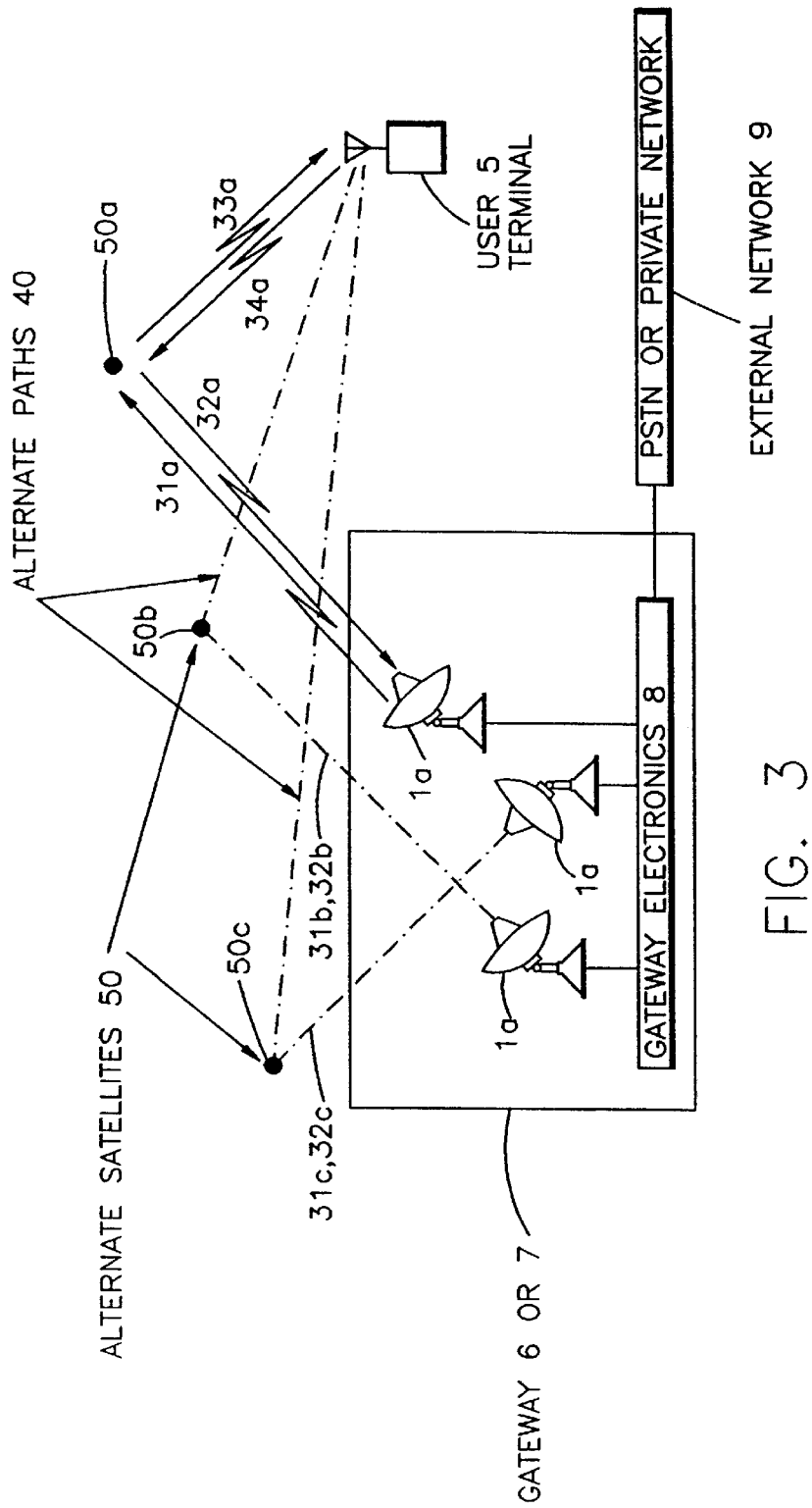
FIG. 3 illustrates the use of primary and alternate paths between the user terminal and a gateway via a plurality of geosynchronous or non-geosynchronous satellites.

Reference is now made to FIG. 3 for illustrating in greater detail the user terminals 5, ground stations or gateways 6 and 7, and their linking elements with the space segment. There are within the coverage areas 21 of the NGSO satellites 2 or GSO satellites 3 at least one but generally many of the user terminals 5. The user terminals 5 bidirectionally communicate over RF links to a first NGSO satellite 2 or to a first GSO satellite 3, collectively referred to hereinafter as satellite 50a. The satellite 50a is in orbit over the gateway to satellite feeder uplink 31a and feeder downlink 32a, and is in orbit over the satellite-to-user terminal downlink 33a and user terminal-to-satellite uplink 34a. These signals may be routed on the satellite 50a to a gateway 6 within the coverage zone 21 of the NGSO satellite 2, GW-NGSO 6, or via the GSO satellite 3 to a gateway 7 within the coverage zone 22 of the GSO satellite 3, GW-GSO 7. The downlinks to GW-NGSO 6 or GW-GSO 7 are routed to a single antenna or multiple antennas 1a and thence to the gateway electronics 8 which in turn is connected externally to provide connectivity to an external network 9, such as the public switched telephone network (PSTN) and/or to private networks. Alternatively the user terminals 5 may be connected to themselves and not routed to a gateway.

Although the following description of the invention is made in the context of a system of NGSO satellites 2 connected via the GW-NGSO 6 to the external network 9 (e.g., the PSTN), it should be understood that this description applies as well to the use of the GSO satellites 3, as well as to a satellite communications system which is connected to a totally internal communications network, and not to the external network 9. For example, the gateway electronics 8 may be connected to a restricted network associated with a governmental or corporate entity, and to which external access is not provided.

Continuing now with the description of FIG. 3, there are at any given time one or more alternate satellites and alternate paths available to communicate to the user terminal 5. These paths can be utilized to increase the user terminal's immunity to fading caused by propagation effects, for example, fading caused by rain attenuation at frequencies above 5 GHz, which becomes more severe above 10 GHz.

Figure 1A:
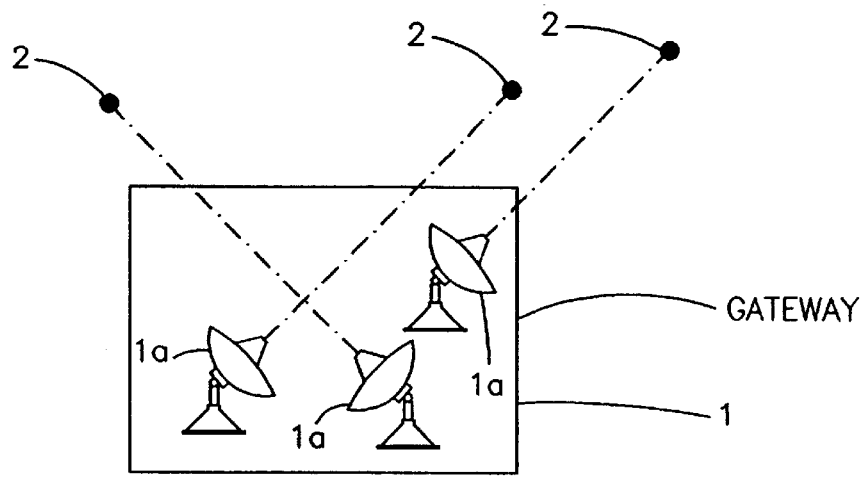
FIGS. 1A and 1B illustrate a conventional single ground station or gateway site and a conventional spatial diversity site, respectively.
Figure 1B:
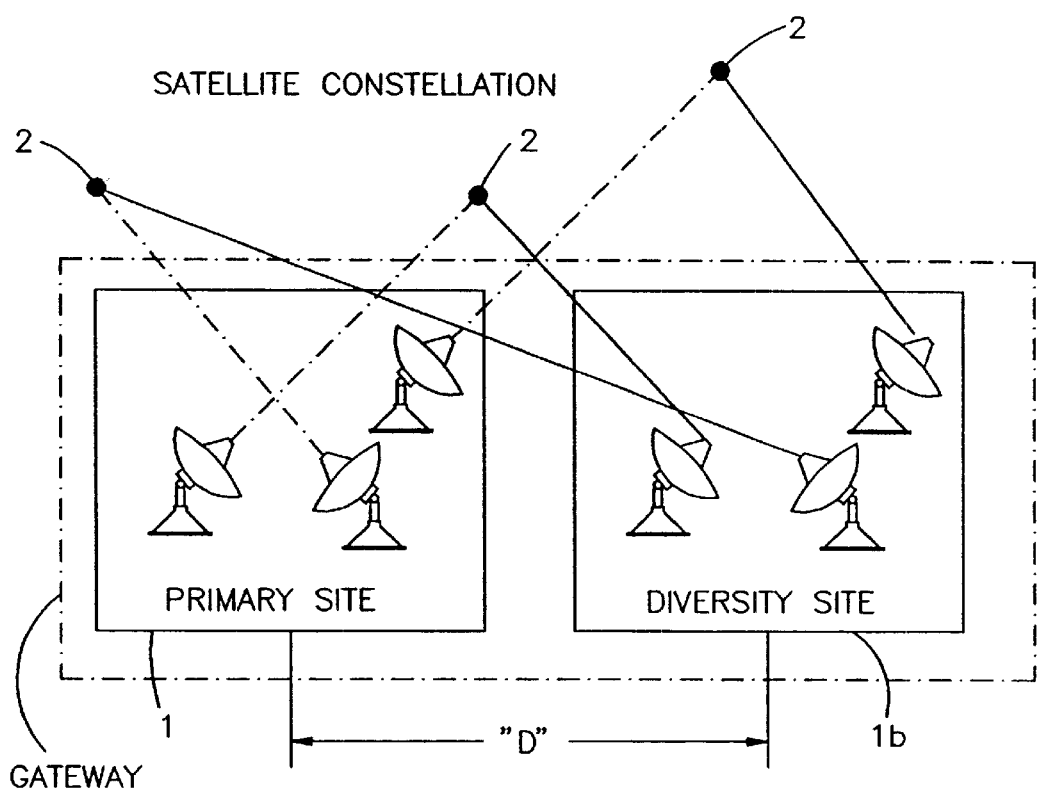

In order to avoid the use of antenna site diversity, as shown in FIG. 1B, the employment of these alternate paths is preferred.

In FIG. 3 there are shown, by example, two alternate satellites 50b and 50c which the downlink 33a and uplink 34a signals to and from the user terminal 5 may be routed over, either simultaneously or individually. The alternate satellites 50b and 50c thus provide alternate signal paths 40. These alternate paths can be designated as 31(*b* or *c*), 32(*b* or *c*), 33(*b* or *c*) and 34(*b* or *c*) depending upon which satellite (50a, b or *c*) the path is directed through. In general the uplink signals 31a, b or *c* are directed toward the desired satellite 50a, 50b, 50c, respectively, by the steerable antennas 1a of the gateway 6. However, the user terminal 5 may also direct its uplink signal 34 through a particular one of the satellites 50a, 50b, and/or 50c.

Figure 4:
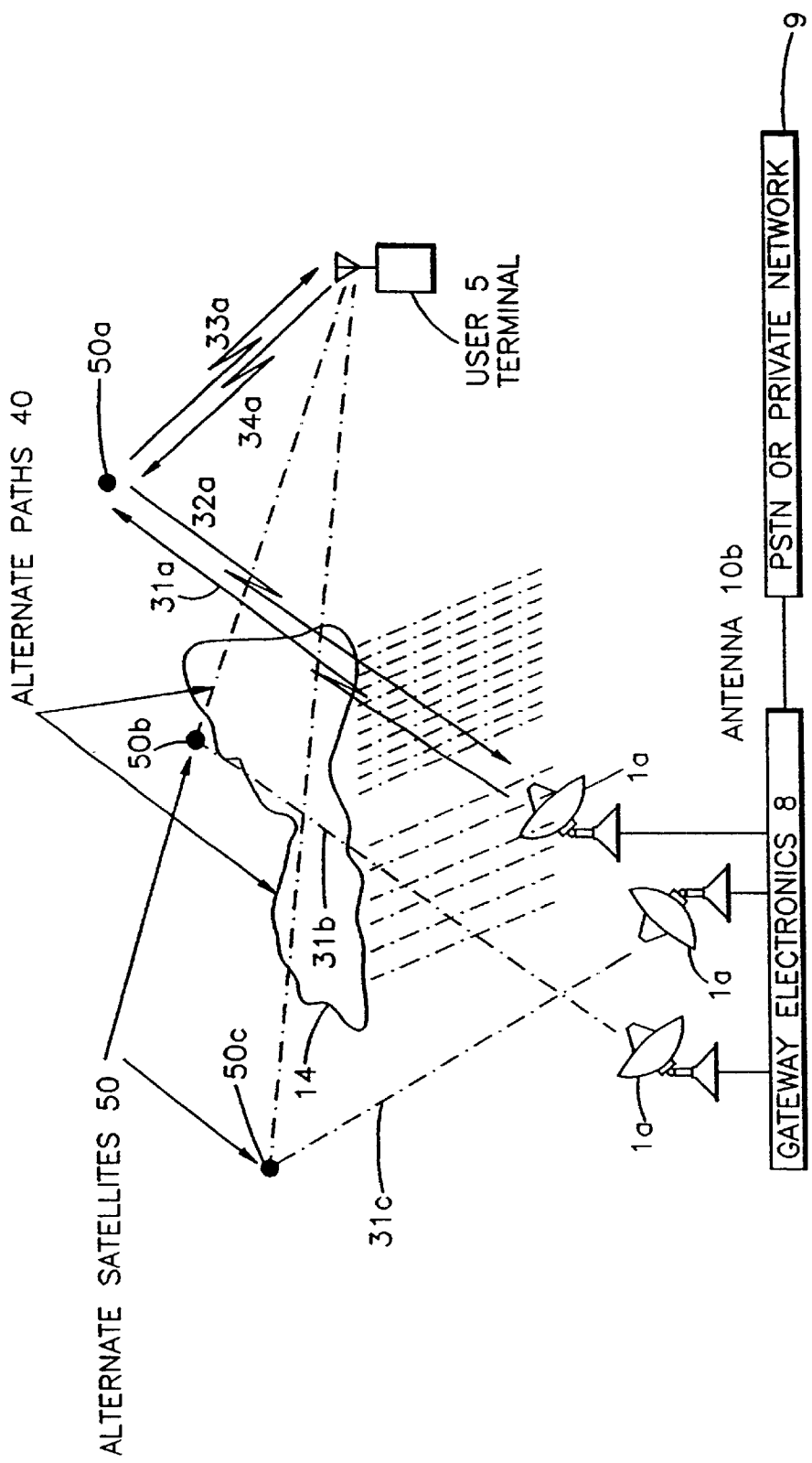
FIG. 4 illustrates the effect of rain on the paths shown in FIG. 3.

At any given time any of these signal paths may be attenuated by atmospheric or other propagation effects, such as rain attenuation. In FIG. 4 the paths 31a and 31b are shown to be attenuated by rain attenuation due to a storm cloud 14. While the entire area of the serving gateway 6 may be attenuated by rain, in general the rain attenuation will be maximum in certain directions. In FIG. 4 the various paths to the satellites 50a, 50b, and 50c, and thence to the user terminal 5, are illustrated, with rain attenuation on the gateway to satellite links 31(*a, b,* and *c*) and 32(*a, b,* and *c*). It can be seen that the attenuation can be more severe on one path than on another (e.g., path 31a versus path 31b), and may be non-existent on yet another path (e.g., path 31c).

The rain attenuation is caused by the signal passing through a "rain cell". A rain cell in general conforms to cloudy areas or regions of dense clouded areas. It should be noted that "rain" per se at the earth's surface is not necessary. In any event the "cell" 14a will include varying levels of rain and moisture. The amount of attenuation on any path is a function of the elevation angle, the size of the rain cell, the amount of rainfall in mm/hr, and other effects such as scintillation caused by the rain, etc.

Figures 5A, 5B:
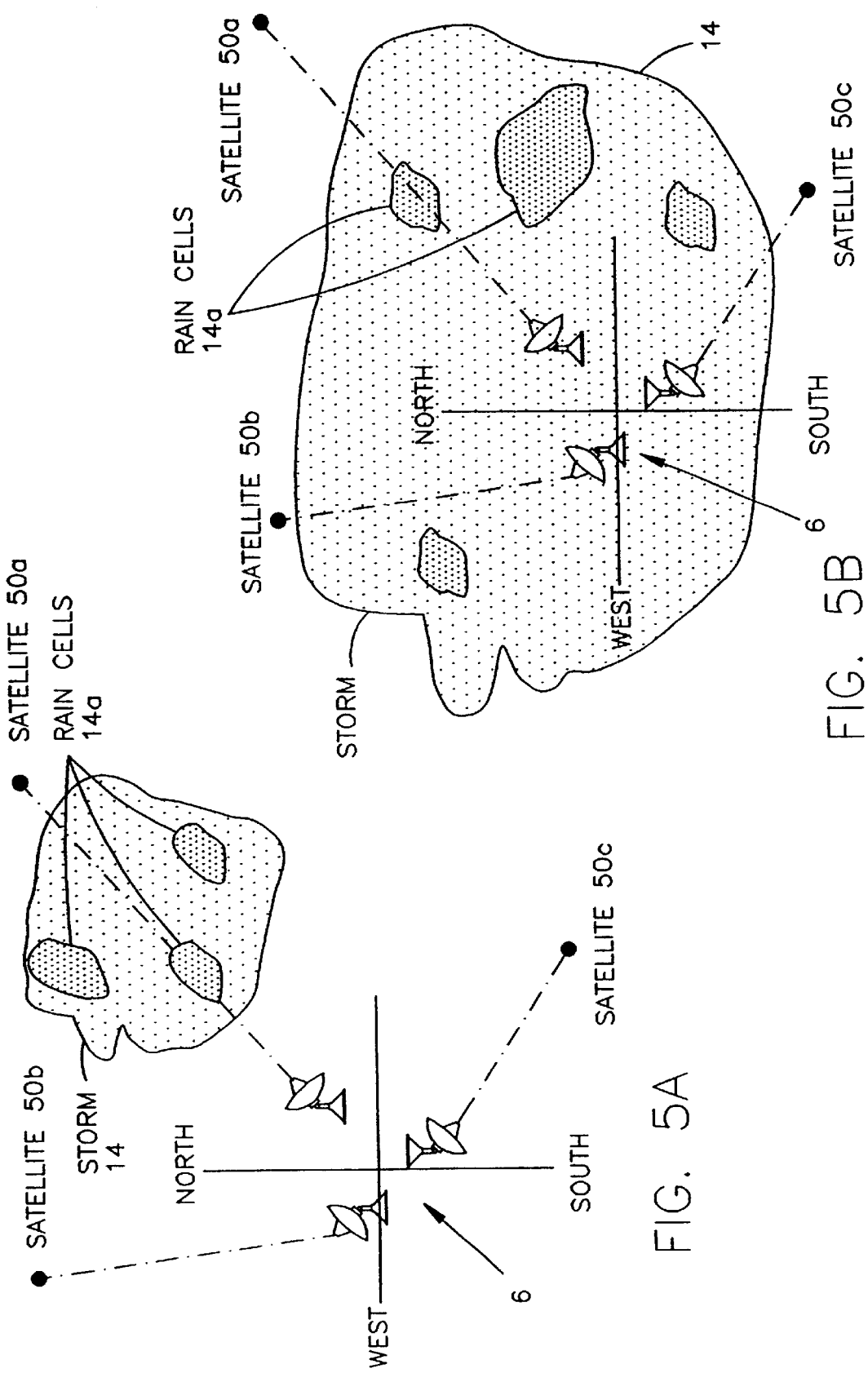
FIGS. 5A and 5B illustrate the effects of a remote storm and a local storm, respectively, on a gateway.

By example, reference can be had to the azimuthal view of the antenna site, as shown in FIGS. 5A and 5B. FIG. 5A shows a case where a storm 14 containing rain cells 14a is remotely located with respect to the antenna site or gateway 6. In this case only the path to satellite 50a is attenuated, while the paths to satellites 50b and 50c are not affected by the storm. As is illustrated, the path to the satellite 50a is passing through a rain cell 14a and is thus experiencing a maximum attenuation. Later in time the rain cell 14a may have moved away and the path to satellite 50a will experience less attenuation, but will still be attenuated relative to the paths to satellites 50b and 50c. FIG. 5B illustrates a case where the storm is directly over the gateway 6. In this case all of the paths are attenuated. However, due to the motion of the rain cells 14a the amount of attenuation will vary over time.

With respect to this invention it is not material which case applies (FIG. 5A or FIG. 5B), although the performance with each will be slightly different. In general the invention applies to both cases.

Figure 6A:
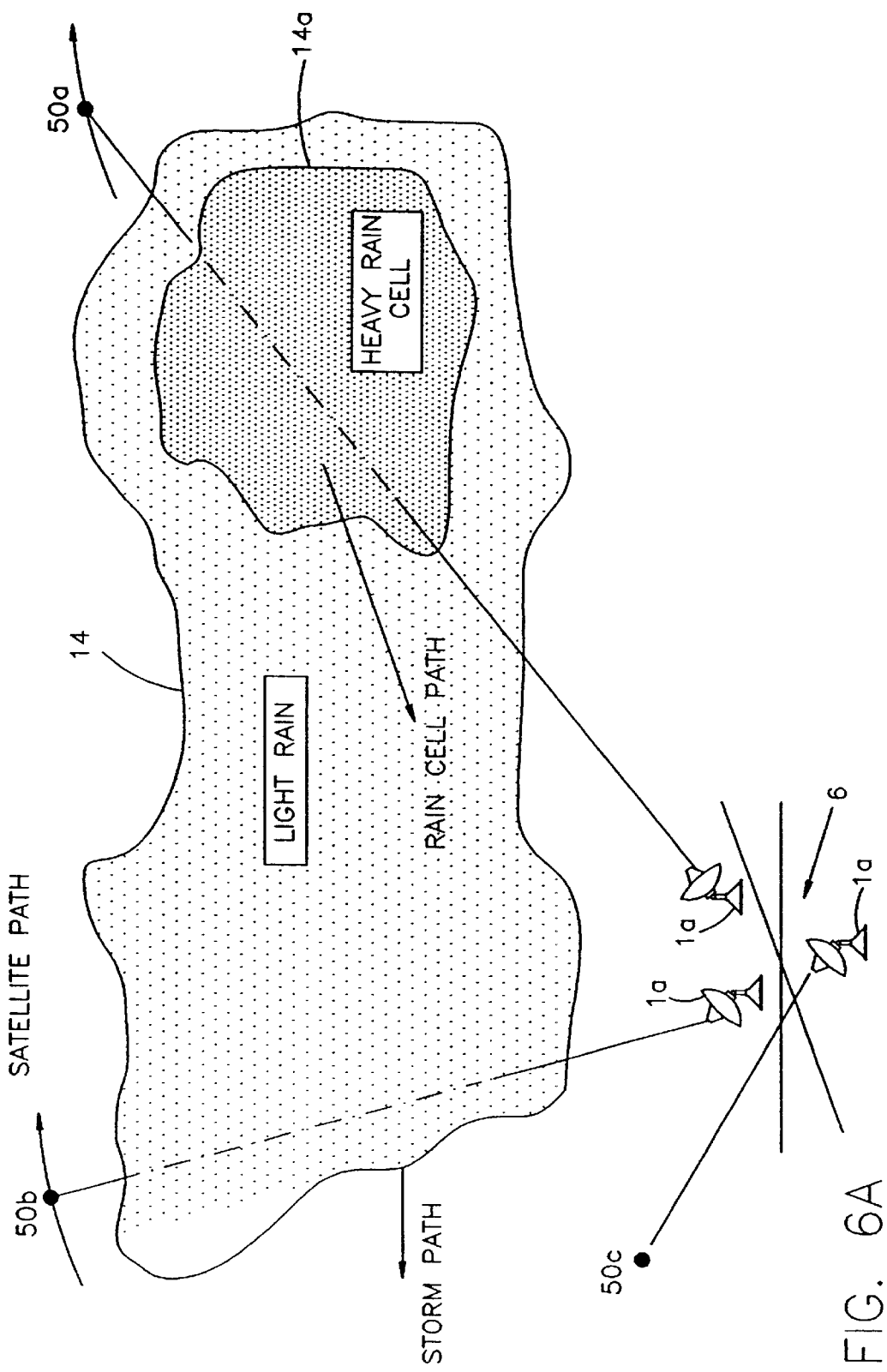
FIGS. 6A and 6B illustrate the varying amounts of attenuation resulting from light rain and heavy rain from a storm moving along a path relative to the gateway and satellites.
Figure 6B:
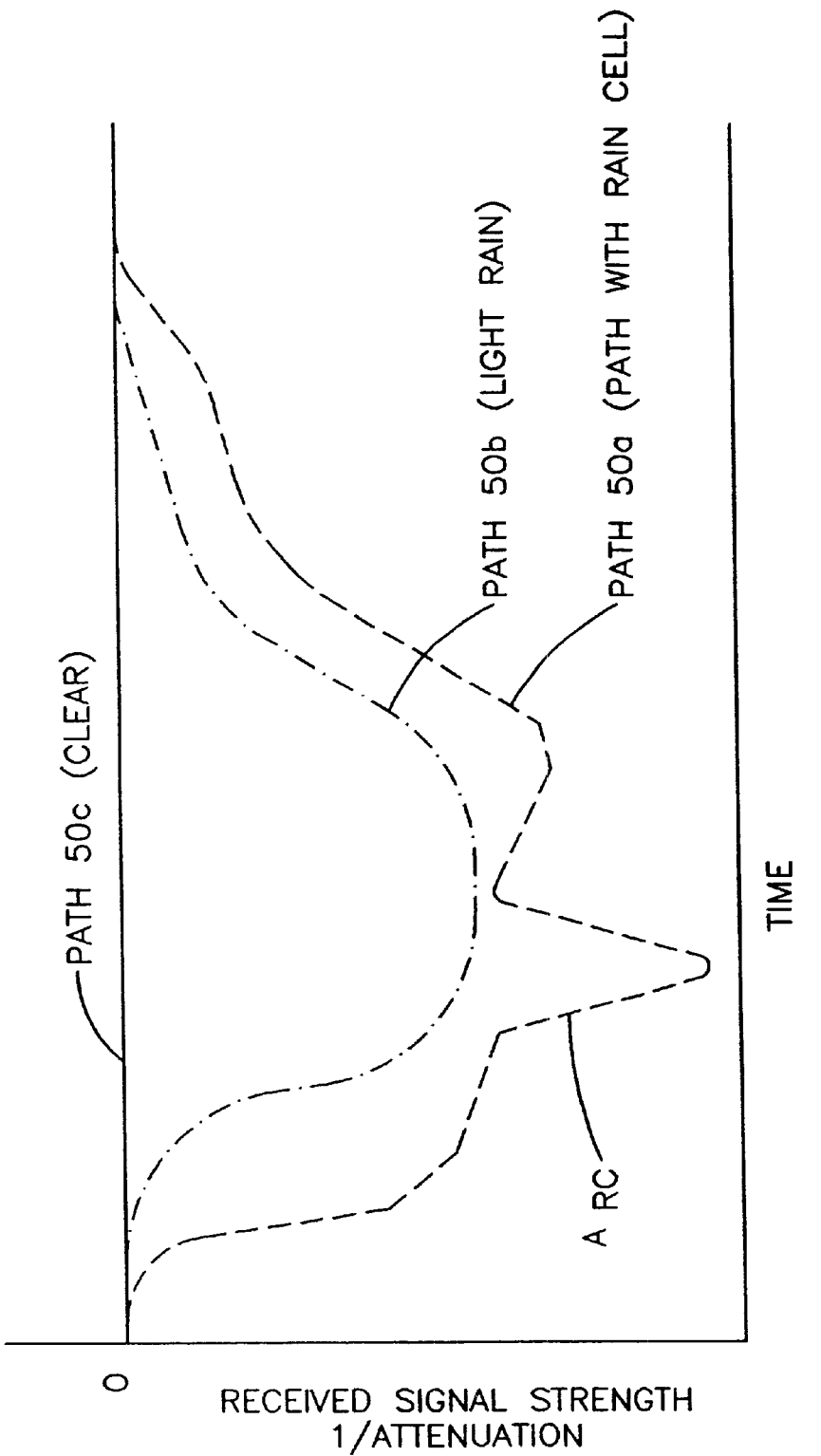

A view of a typical storm event is shown in FIG. 6A. In this example there is shown the three antenna gateway site 6 situated in a region with a large area of light rain and a single heavy rain cell 14a. There are, at the moment, three satellites 50a, 50b, 50c which are being tracked by the three antennas 1a at the site 6. The satellites 50 may move with respect to the ground coordinates of the site 6, the storm 14 and the rain cell 14a, or, as in the case of synchronous satellites, may be fixed in relative location. The received signal strength at the gateway antennas 1a varies over time as, a function of the intensity and location of the storm 14 and the rain cell 14a and the motion of the satellites in orbit. In the illustrated example, and referring also to FIG. 6B, it is shown that the path to satellite 50c is clear and will remain clear for some time, depending on the speed of the storm front. The attenuation on this path, due to the storm 14, is considered to be zero at this time. The path to satellite 50b is attenuated during the same time frame by an amount consistent with light rain. The value of attenuation on the path to satellite 50b (assuming the NGSO satellite case) varies over time due to satellite motion and elevation angle, which exposes a longer (or shorter) path through the rain, the movement of the storm 14 along the storm's path, and changes in rain intensity. The path to satellite 50a is attenuated as well. Its path is attenuated in a similar manner to that of 50b except for the period that the signal is passing through the heavy rain cell 14a, at which time additional attenuation is experienced (designated as $A_{RC}$ in FIG. 6B). It should be noted that the light rain attenuation of the paths to satellites 50b and 50a are different, due in large part to the difference in elevation angles and, thus, the longer distance that the RF signal must propagate through the storm 14.

As was discussed previously, the communications capability is enhanced by selecting the path or paths with the lowest attenuation, or by combining lowest attenuation paths, while avoiding paths which are heavily attenuated. This approach maximizes communications signal strengths and reduces the amount of signal strength margin required. That is, instead of transmitting at a power level that is required to compensate for the heavily attenuated paths, and thus consuming a considerable amount of satellite power, the preferred approach is to avoid the heavily attenuated path or paths in favor of the less attenuated path or paths. In order to accomplish this technique it is necessary to make decisions based on observed amounts of path attenuation.

In the previous systems known to the inventor these decisions were made based on received signal strength at the gateway 6 from some RF source or beacon, generally located on the satellite or passed through the satellite. However, a disadvantage of this approach is that the attenuation information is only instantaneously known, thereby precluding an ability to perform short term or long term planning of link allocation and power budgets.

As an example, consider rain attenuation on a satellite downlink in the Ka frequency bands of 28 GHz in a SS/CDMA system utilizing a configuration of satellites having overlapping coverage (as in FIG. 2C). It should be noted, however, that the principles discussed apply also to other frequencies, links, types of impairments, and system modulation techniques.

Reference in this regard is made to FIG. 2F. The system 10 attempts to link two NGSO satellites NGSO SAT-1 and NGSO SAT-2 with the user terminal 5. As shown in FIG. 2F the user terminal 5 is transmitting a signal at a power P towards the two satellites simultaneously. The signals received at the user terminal 5 from the two satellites are coherently combined in the user terminal 5 to form a single, composite signal. Reference in this regard can be had to the above-referenced U.S. Pat. No. 5,233,626, issued Aug. 3, 1993, entitled "Repeater Diversity Spread Spectrum Communication System", by S. A. Ames. A final destination for the signal transmitted to the two satellites from the user terminal 5 may be the NGSO gateway 6, the GSO gateway 7 (via the GSO satellite 3), or another user terminal 5. In any case there is a certain received signal quality necessary at the NGSO satellites 2 to achieve a desired result at the final destination.

As shown in FIG. 2F one of the uplinks 33a, and perhaps also the downlink 34a, are being attenuated by the rain cell 14a. The received power P(NGSO SAT-1) at the NGSO SAT-1 is less than the desired level due to this attenuation (it being realized that the NGSO SAT-1 is also simultaneously receiving uplinks from other user terminals 5, which may or may not be impaired). By knowing that this impairment is occurring, and the level of the impairment, the system can compensate for this link only (e.g., only the link 34a) while leaving all the other user terminals unaffected. Thus energy is conserved and satellite cost and weight is minimized. Likewise the power from the user terminal 5 on the uplink 34a can be directed preferentially towards the NGSO SAT-2, thus conserving battery and link power.

What follows now is a description of a presently preferred embodiment of the invention for multiple satellite attenuation control at a gateway, either the NGSO gateway 6 or the GSO gateway 7.

Figure 7:
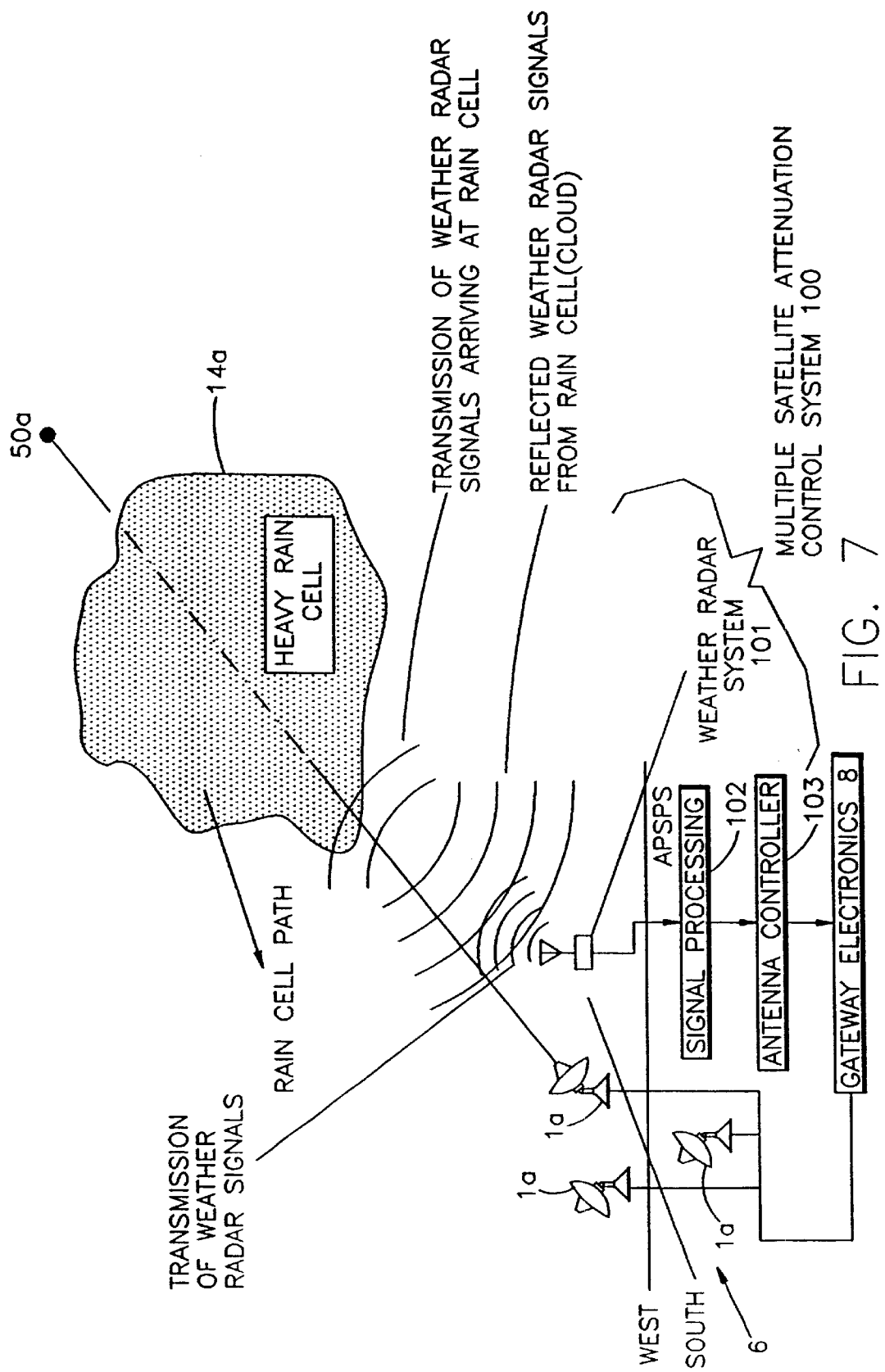
FIG. 7 is a simplified block diagram of a gateway site, in accordance with this invention, that is constructed to include a multiple satellite attenuation control system having a weather mapping system.

FIG. 7 illustrates a presently preferred embodiment of this invention. In addition to the antennas 1a and gateway electronics 8 there is provided a Multiple Satellite Attenuation Control System (MSACS) 100 having three main elements or components. The first of these three components is a Weather Radar System (WRS) 101, or any other suitable system capable of measuring, in azimuth and elevation, the location, size and shape of a rain cell and/or a rain storm). The second component is an Attenuation Potential Signal Processing System (APSPS) 102. The third component is a Gateway Antenna Control Electronics (GACE) unit 103. The system operates using any suitable weather radar system 101 to transmit bursts of RF energy in such a manner that received reflected radar signals from a rain storm 14 or rain cell 14a within the storm can be characterized as to the location, distance, and, if possible, intensity from the WRS 101. Suitable systems are currently known to be used by air traffic control personnel at airports to model mathematically the intensity and location of clouds, and severe weather conditions in proximity to airports. The frequency of operation of the WRS 101 may be, but is not necessarily, in the same band of frequencies as the communication signals to and from the satellites 2 or 3 (e.g., the satellite 50a). That is, the operating frequency of the WRS 101 may be in a different band of frequencies assigned to weather radars or other weather predicting equipment.

Figure 8:
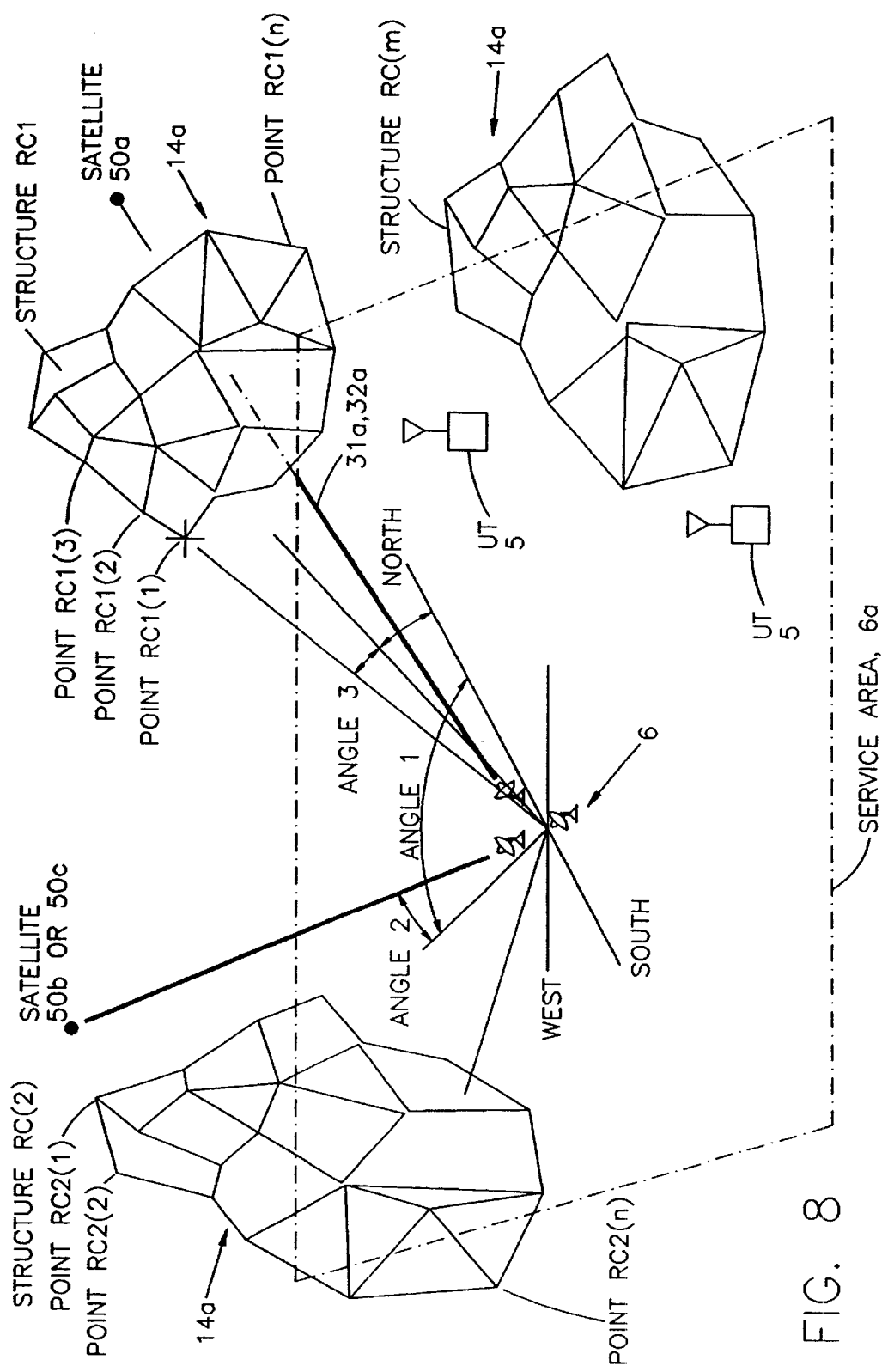
FIGS. 8–11 illustrate various aspects of the modeling of weather-related attenuation-inducing structures, such as rain cells, and the derivation of various three dimensional attenuation contours associated with these structures, in accordance with an aspect of this invention.

In accordance with the teaching of this invention, the WRS 101 and related components are used as follows. The WRS 101 transmits signals in a manner so as to survey an area around the gateway antenna site 6. The WRS 101 may use a conventional mechanical, rotating radar antenna system, a phased array antenna system, or any other suitable means for obtaining weather-related information from a region that contains the gateway 6. The resulting data is passed to the APSPS 102 which constructs a mathematical model of the cloud(s) or storm and/or rain cell(s) based on the data provided by the WRS 101. FIG. 8 illustrates a representation of the mathematical model derived by the APSPS 102 of the resultant attenuation data for several clouds, storm, or rain cells 14a. This model is then passed to the GACE unit 103 where information is calculated and decisions made on how to best optimize the communication capability to the user terminals 5 within the coverage area 6a of the gateway 6. For example, and referring briefly to FIG. 6A, a decision may be made to utilize path 50c instead of paths 50a and 50b.

Within the GACE unit 103 a time history is developed for ephemeral data of the satellite geometry to further predict and plan optimized satellite transmission to the user terminals 5 affected by the storm.

Referring again to FIG. 8, in this example a signal from the gateway 6 is directed along path 31a, 32a towards satellite 50a. The data from the WRS 101 for a given rain attenuation cloud or rain cell is processed by the APSPS 102 and a series of points are described using vector RC1(1) (angle 1, angle 2, and distance d1); vector RC1(2) (angle 1, angle 2, d2) and so on as RC1(1) RC1(2) RC1(3) . . . to RC1(n). These points are then connected using a Computer Aided Design program or a solid modelling program into a wire frame or solid model construction representing the rain cell 14a, cloud, or storm. Similarly, other rain attenuation (cloud) structures RC2(1 . . . n) . . . to RC(m) (1 . . . ) are likewise constructed and plotted in three dimensions by the APSPS 102.

Figure 9:
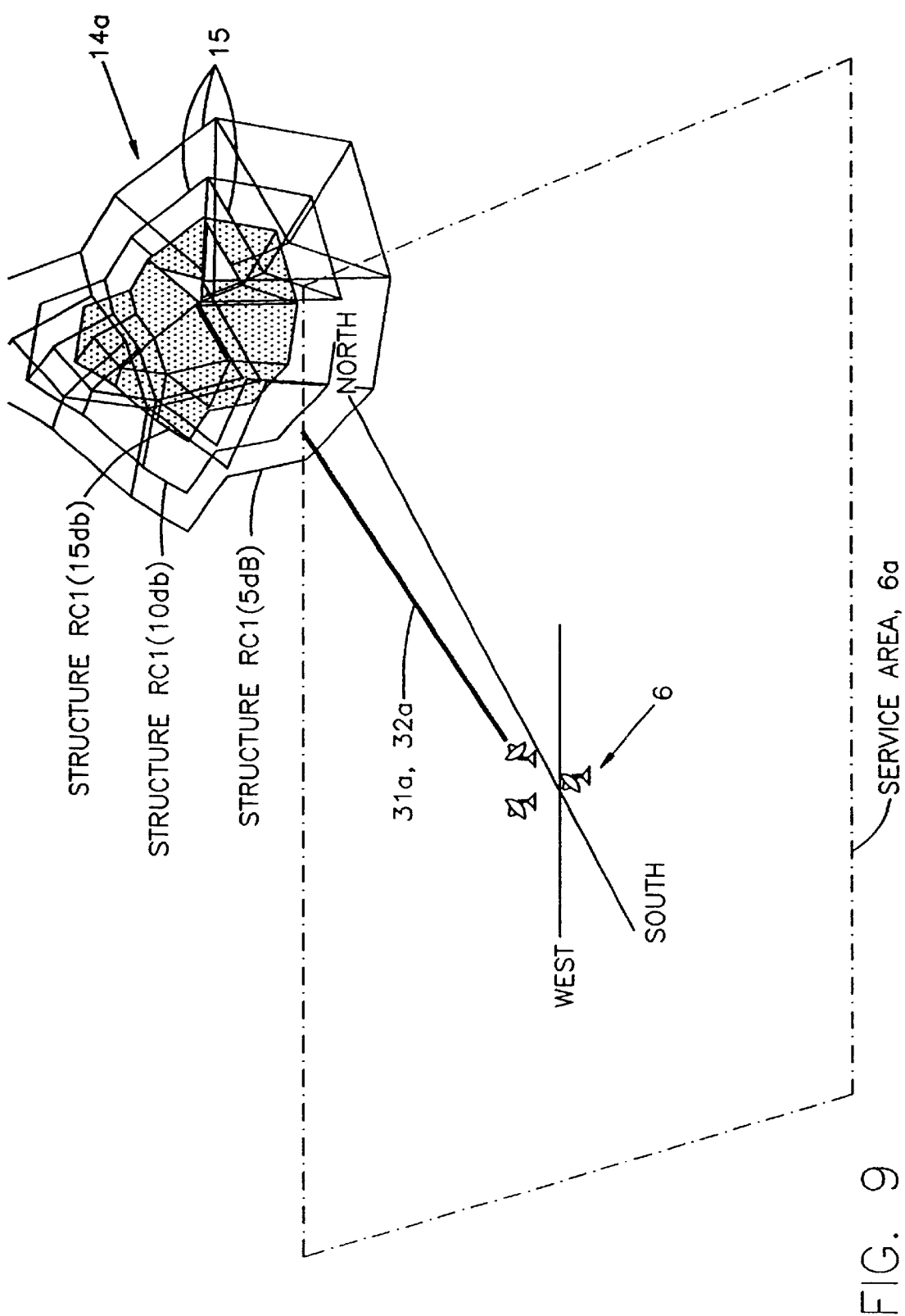

Next, and referring to FIG. 9, layers or shells 15 of various attenuation strengths for each structure (RCi) may be constructed, as shown for only the structure RC1. Other shells for the other structures RC2 to RC(m) may be constructed in a similar manner.

Figure 10:
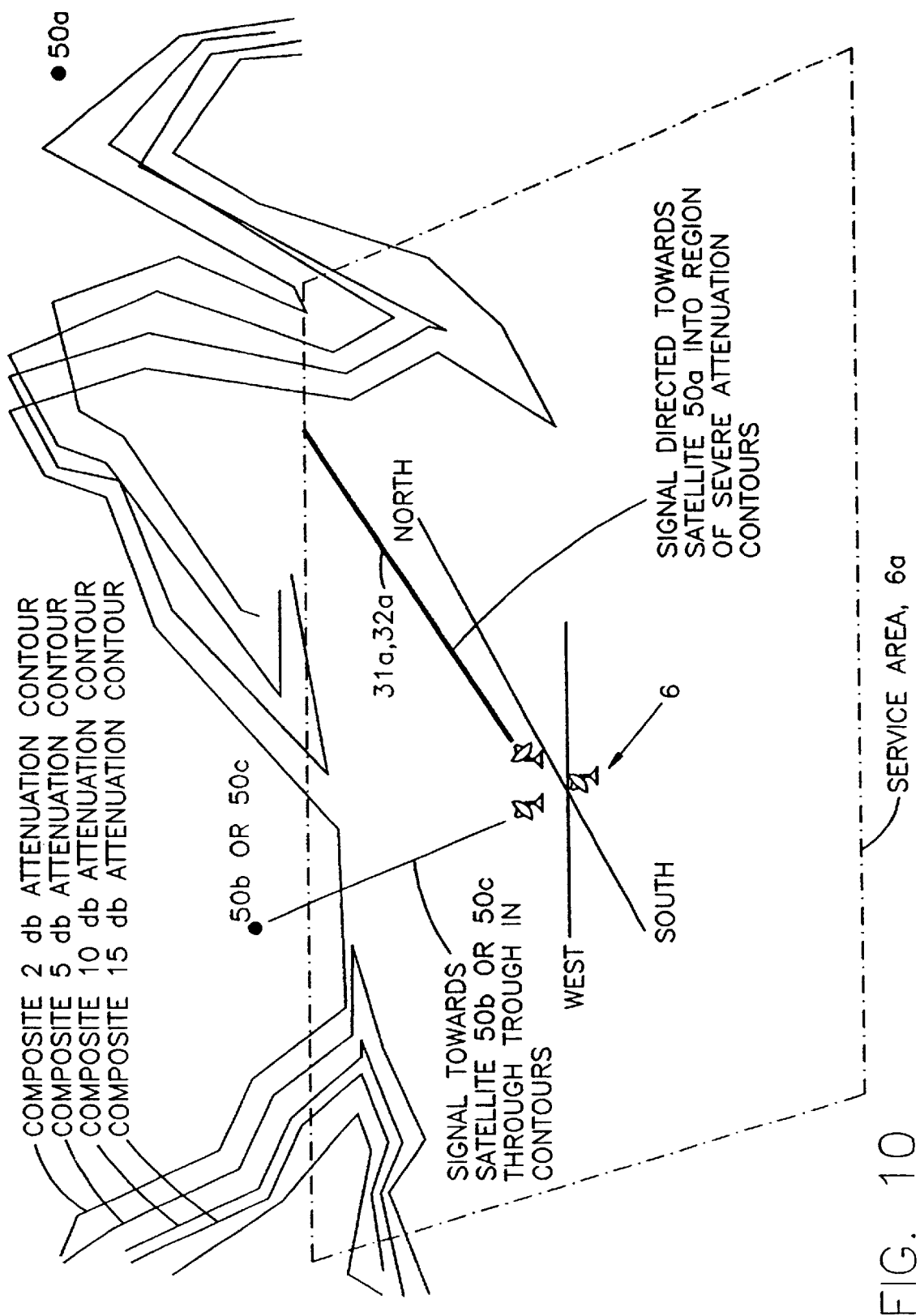

The resulting RC1 structures then become;

$RC1("a"dB), RC1("b"dB), RC1("c"dB) \ldots$ to $RC1("x"dB);$ where "a", "b", "c" to "x" represent different levels of attenuation, shown in FIG. 9 as $RC1(5\ db), RC1(10\ db)$ and $RC1(15\ db).$ Composite attenuation contours of various dB levels are then constructed from the data available as shown in FIG. 10. These contour level shells then become input data to the GACE unit 103 for use in decision making as to transmission strategies. It is clearly shown in the example of FIG. 10 that the signal directed towards a satellite which is visible through the "trough" in the contour pattern experiences considerably less attenuation than the signal 31a, 31b that passes through the region of severe attenuation due to the presence of one of the rain cells 14a shown in FIGS. 6–9.

The above-described atmospheric modelling is thus used to choose, in real time or approximately real time, a "best" communication path or paths in order to avoid severe attenuation on a single link.

Further in accordance with this invention sequences of data stored in the APSPS 102 are used to develop a historical plot of the track of the severe attenuation regions or rain cells 14a. The historical plots may be used to predict not only future attenuation values, but can also be used in conjunction with other propagation effects, such as sky noise, noise from the quiet and active sun, and tropospheric effects versus elevation angle, for advance planning of which satellites to direct the communication links through.

Figure 11:
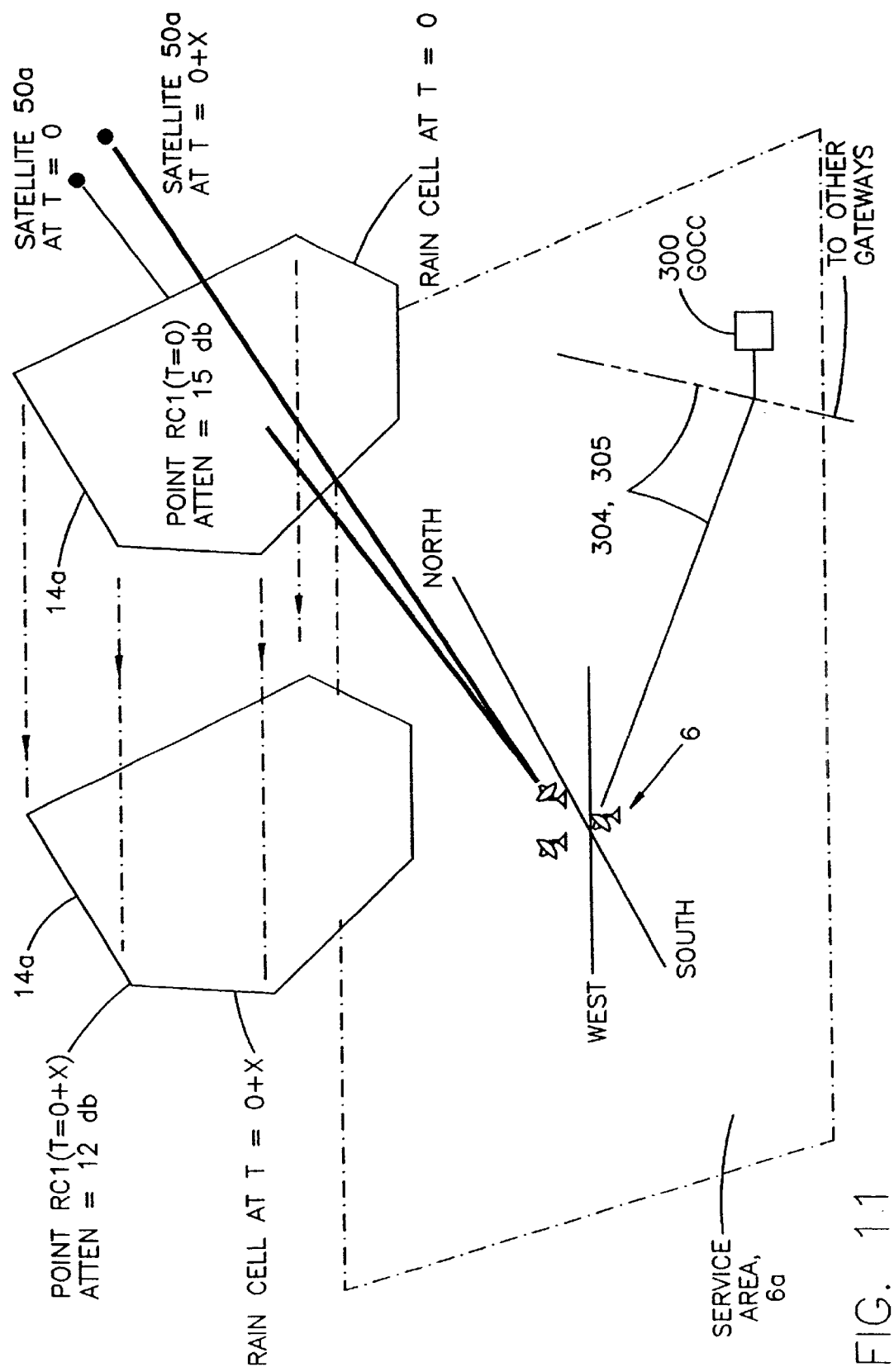

For example, FIG. 11 illustrates a rain cell 14a with measured attenuation points for RC1(1) at time zero (T=0) with an attenuation of 15 dB. After a time X the rain cell point RC1(1), at T=0+X, has moved to a new location with a new vector location of RC1(1) (angle 1 at T=0+X, angle 2 at T=0+X, and distance d1 at T=0+X). In addition, the predicted attenuation at the second (later) location may be the same, more, or less than the attenuation at the first location (i.e., at T=0). New or revised attenuation contours may be constructed, if necessary, based on, for example, an observed actual change in attenuation contours from time T=0–X. For example, if it is observed through measurements made by the WRS 101 that the rain cell 14a appears to be weakening, or strengthening, over time, the attenuation contours of the rain cell 14a at T=0+X are adjusted accordingly. In like manner if it is determined that the ground speed of the rain cell 14a is increasing or decreasing over time, the predicted location of the rain cell at T=0+X are adjusted accordingly.

It should be noted that individual satellites 2 of the constellation of NGSO satellites are also moving with respect to the gateway 6 and user terminals 5 between T=0 and T=0+X. The planning carried out by the APSPS 102 thus includes the movement of the NGSO satellites 2 with respect to the predicted movement of the rain attenuation contours.

The attenuation contour data and its time history is next passed to the GACE unit 103 which makes decisions, based on this data, as how to select available satellites to maximize the communications capability and utilization of the satellite resources.

As shown in FIG. 11, for the typical case of multiple gateways 6 (and/or 7) this information may be sent to a central location, such as a Ground Operations Control Center (GOCC) 300 over data lines 304, 305 for further optimization of the overall satellite constellation power utilization.

Figure 12:
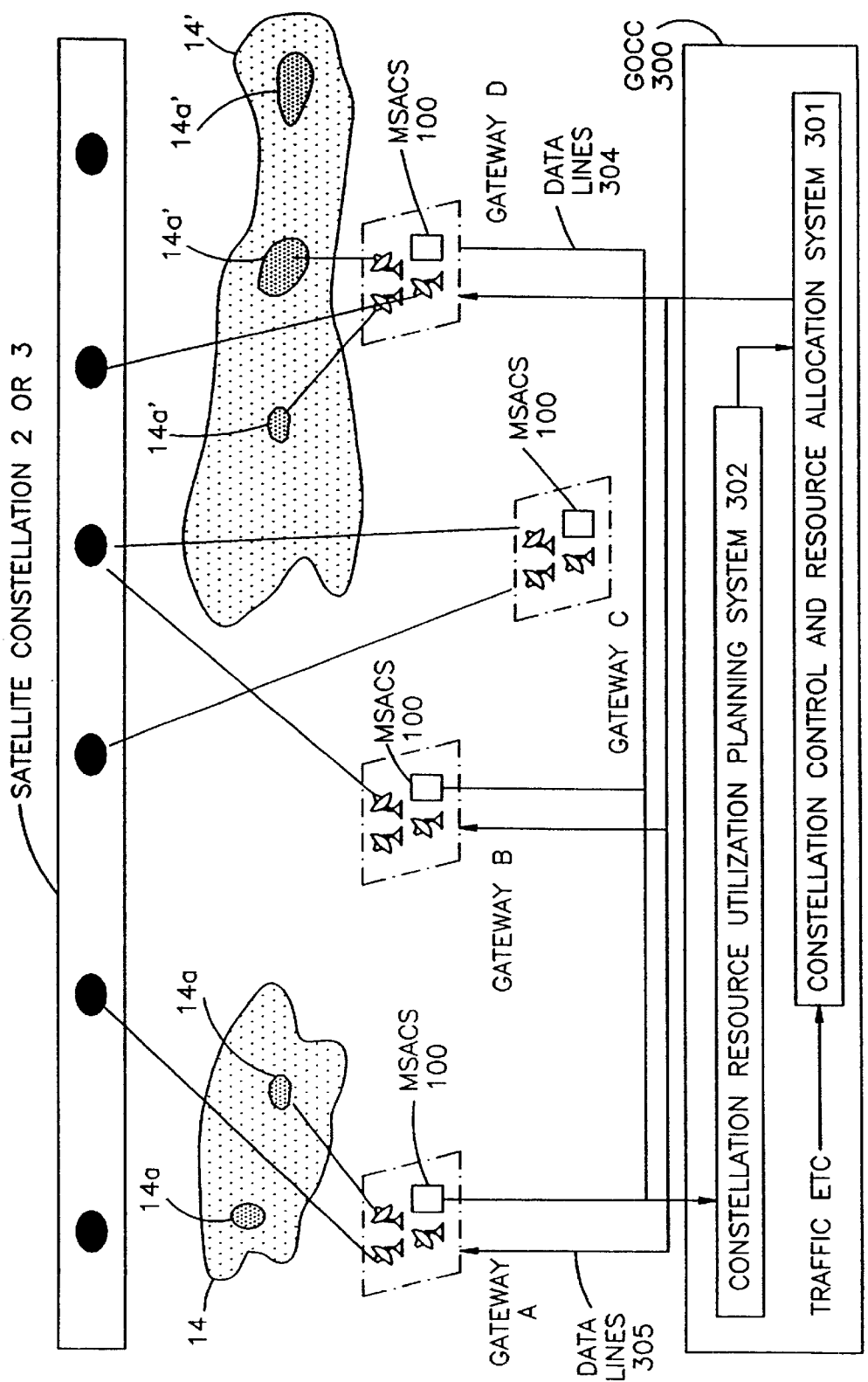
FIG. 12 is a simplified block diagram of a satellite communication system in accordance with this invention having a plurality of spatially-separated gateways interconnected with a ground operations control center.

For example, FIG. 12 illustrates a configuration of multiple gateways (designated A–D) which are accessing a multiple satellite constellation (2 or 3) which is experiencing attenuation from multiple rain storm systems 14 and 14'. The storm systems 14 and 14' may be separated by hundreds or thousands of kilometers, depending on the placement of various ones of the gateways A–D. By example, the storm system 14 may be located over Brazil, while the storm system 14' may be located over Indonesia. The gateways A–B are shown connected to the GOCC 300 by the data lines 304 and 305. Reference in this regard can also be had to FIG. 18.

In accordance with the teaching of this invention the gateways A–D each include a local Multiple Satellite Attenuation Control System (MSACS) 100 as shown in FIG. 7. Each MSACS 100 generates attenuation contour information which is processed and transmitted over data lines 304 to the GOCC 300. The GOCC 300 may be comprised of a plurality of regional sub-GOCCs interconnected to a master GOCC, or the functionality of the GOCC 300 may be integrated at one site. In any case the attenuation data is input to a Constellation Resource Utilization Planning System (CRUPS) 302 which compiles the attenuation data and which provides preliminary gateway-by-gateway utilization information. It is clear from the example in the diagram that gateway A is experiencing attenuation caused by storm system 14, while gateway B is in the clear and has no attenuation at all. Gateway C and D are experiencing varying amounts of attenuation with storm system 14' (in this example gateway C less than gateway D).

After the CRUPS 302 has obtained the attenuation data (which may be preprocessed by the originating gateways) it compares the communications needs of the individual gateways, and performs an optimization of the utilization of the entire constellation being accessed by the various gateways A–D. This optimization includes instantaneous direction in near real time as to optimization and future planning based on the time history data received from various ones of the MSACSs 100. The decisions and future planning from the CRUPS 302 is then input to a Constellation Control and Resource Allocation System (CCRAS) 301 which combines this information with other information derived from other sources, such as current and/or predicted communications traffic demand, etc. The CCRAS 301 then issues commands via data lines 305 to the gateways A–D. These commands may be actual antenna utilization commands, or more general instructions such as bandwidth, numbers of channels, and limits on satellite power that may be used. If these general commands are used then each gateway A–D utilizes its own information regarding storm system contours, in combination with the commands from the CCRAS 301, to best optimize constellation power availability to satisfy the demand required by its associated user terminals 5.

By example, as shown in FIG. 12 the satellites over gateway B are not experiencing any significant storm-related attenuation, whereas the satellites over gateways C and D are experiencing storm-related attenuation. Assuming that the motion of the satellites is from left to right in FIG. 12, the GOCC 300 knows that the satellites over gateway B will be entering the coverage region of gateway C in X minutes. Based on the information received from the MSACS 100 of gateway D, the GOCC also knows that the storm 141 will most probably be increasing in strength, and will most probably be moving even further into the coverage region of gateway C, in X minutes. The GOCC 300 then plans for the increased power demand on the satellites as they enter the coverage region of gateway C. This planning can include sending a command to the gateway B to select which visible satellites to load, or to only lightly load one particular one of the visible satellites with communications traffic, if demand permits, thereby reserving power on this satellite or satellites for the time that the satellite or satellites enters the coverage region of gateway C. This planning can also include, for the case where the user terminals 5 can be assigned multiple satellite diversity, reducing the diversity level for the user terminals 5 being serviced by the gateway B to some minimal acceptable level, thereby further reducing the satellite loading and conserving satellite power. These various decisions also preferably take into account the expected communications traffic. By example, the decision to reduce the diversity level of the user terminals 5 being serviced by the gateway B may be affected by the expected communications demand when the satellite(s) enter the coverage region of gateway C. If the expected demand in X minutes coincides with a peak communication demand period, then all available measures may be used to conserve satellite power, while if the expected demand in X minutes is expected to be minimal when the satellite(s) enter the coverage region of gateway C, then only minimal or even no power conservation measures may be commanded to the gateway B. It can thus be seen that the use of this invention enables preemptive communications link allocation and control based at least in part on predicted weather-related signal attenuation at a remote location. Although this example has used time expressed in minutes, in fact the decision process may be limited only by the decision time and the time required to obtain the necessary data, and can thus be sub-second in nature.

In a further embodiment of this invention, an alternative to utilizing the weather radar data generated by the WRS 101 is to use NASA downlink data from the Geostationary Orbiting Environment Satellite (GOES) and/or other satellite data from the National Oceanic and Atmospheric Agency (NOAA). These satellites produce severe weather observations, as well as cloud structures, and atmospheric sounding data which can be utilized to build weather-related models around a particular gateway site, much in the same manner as the weather radar data described above.

Combinations of weather radar and satellite data can also be used.

Figure 13A:
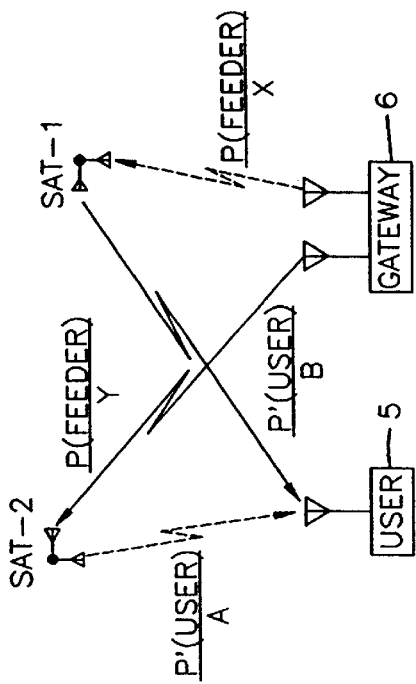
FIGS. 13A–13D are diagrams useful in explaining the amount of power required to close a communication link or links between a gateway and a user terminal via one or more satellites.

Reference is now made to FIGS. 13A–13D for illustrating a method of controlling the gateway power, which in turn drives the individual link input to each satellite 2 on a link-by-link basis, or as a summation of various links, or on a single link basis. A power P as transmitted from the gateway 6 towards user terminals 5 is received on two paths via two different NGSO satellites (SAT-1 and SAT-2). As noted before, the signals on each path may be at different strengths due to impairments. In FIG. 13A a typical user terminal 5 to gateway 6 link for satellite communications is shown. Considering now a simple repeating satellite or bent-pipe transponder (non-onboard satellite processing) as an example, the gateway 6 transmits a feeder link to the satellite (Sat-1) at a power of P which the gateway 6 has determined necessary to close the link at a certain Eb/No at the user terminal 5. This power P may include some margin to overcome link impairments. In turn, the reception of the feeder link causes SAT-1 to generate a power P' toward the user terminal 5 that is necessary to close the link, again at a certain Eb/No and with or without some additional margin.

It should be noted that the power necessary for P' may be calculated or otherwise determined on the satellite itself for one or both link directions, for an onboard processing embodiment, and is not necessary to be known at the gateway 6.

Figure 13B:
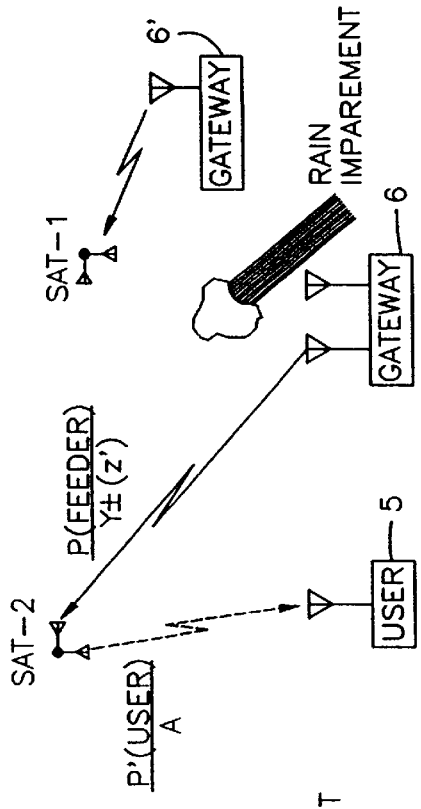

If two satellites are employed to transmit the signal, and to then coherently combine the signals at the user terminal 5, the power P and P' may be split between the two satellites according to FIG. 13B as:

P(feeder) for Satellite 1=P(feeder)/X

P(feeder) for Satellite 2=P(feeder)/Y and

P' (user) for Satellite 1=P' (user)/A

P' (user) for Satellite 2=P' (user)/B where,

P(feeder) is the power to close the link with only one satellite without impairments, P' (user) is the power to close the link with only one satellite without impairments, X=a power reduction factor on the link from gateway 6 to Sat-1, Y=a power reduction factor on the link from gateway 6 to Sat-2, A=a power reduction factor on the link from Sat-1 to user terminal 5, and B=a power reduction factor on the link from Sat-2 to user terminal 5.

The user terminal 5 receives the signals from the two (or more) satellites and coherently combines the signals to reduce the power required on each link to the minimum necessary. The values of X, Y, A, and B are not necessarily the same. When a link impairment is observed by the MSACS 100, as described above, the strategy of satellite usage and values used for the power reduction factors are defined such that the power of the transmitters is adjusted to continue to close the link with the minimum required power.

Figure 13C:
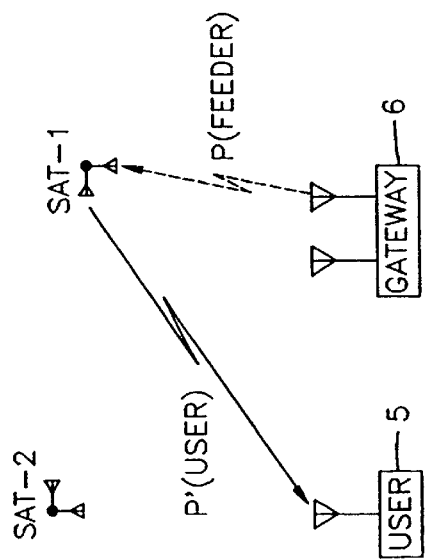

As an example, reference is made to FIG. 13C where the link from the gateway 6 to Sat-1 is impaired by "n" dB. In this case several options are open to the gateway 6. In a first option the gateway 6 may increase the power P on the feeder link to Sat-1, thus maintaining the overall link quality, in accordance with:

$$P(\text{feeder Sat-}1_{new})=P(\text{feeder Sat-}1)/[X-(z)],$$

where z=a delta power factor which reduces X, thereby increasing P(feeder) to compensate for the apparent rain fade. This approach can be used up to a transmitter power limitation in the gateway 6.

In a second option the gateway 6 may cause Sat-1 to increase the power on the satellite-to-user link to compensate for the reduction in P(feeder) which is uncompensated, and thus reduced by the rain fade. This is, however, not an optimum solution due to the required increase in satellite power usage on Sat-1. The use of onboard processing of these signals gives additional options here, and is included in the invention by reference.

In a third option the gateway 6 increases the power on the P(feeder) link, according to the first above-described option, until a gateway transmitter limitation is reached:

$$P(\text{feeder Sat-1}_{new}) = P(\text{feeder Sat-1})/[X-(z)],$$

where z=the delta power factor which reduces X, thereby increasing P(feeder) to compensate for the apparent rain fade. The gateway 6 then instructs the antenna serving Sat-2 to increase power:

$$P(\text{feeder Sat-2}_{new}) = P(\text{feeder Sat-2}/[Y-(z')],$$

where z'=a delta power factor which reduces Y, thereby increasing P(feeder Sat-2) to compensate for the rain fade on the link to Sat-1. Again, this approach can be used up to a transmitter power limitation in the gateway 6. The signals from the two satellites are combined at the user terminal 5 so as to meet, by example, a specified energy per bit/noise ratio, a frame error rate, or a symbol error rate requirement.

Figure 13D:
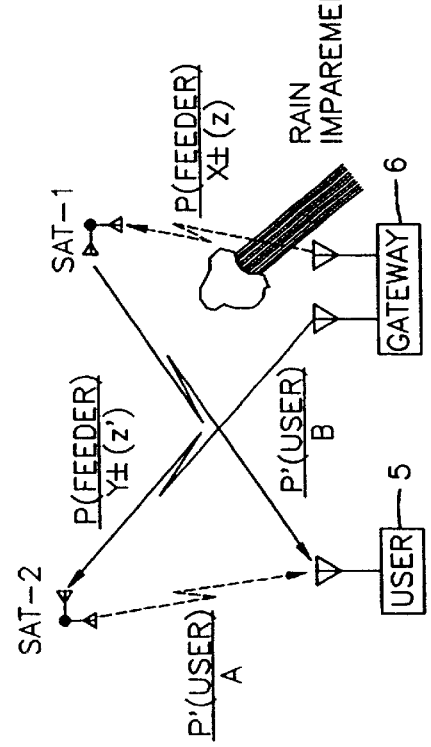

In a fourth option, according to FIG. 13D, the gateway 6 may abandon the link to Sat-1 altogether, due to the severity of the rain fade on the link, thereby freeing up the frequency and allowing the use of this frequency for other purposes, such as by another gateway 6' not experiencing the rain fade.

It can be realized that the ability to predict, plan, and avoid heavy rain attenuation in accordance with the teaching of this invention enables the optimization of the use of the constellation of satellites, and furthermore serves to conserve satellite power.

The teaching of this invention can be implemented in at least two manners. A first approach assumes that the fading is reciprocal in the transmit and receive frequency bands of the user terminal 5, thereby requiring only single link planning for the avoidance of heavy attenuation. A second approach individually control the separate uplink and downlink in each respective frequency band, and thereby does not require any assumptions on the fading depth of the uplink 34 and the downlink 33.

A further approach to the modelling of the uplink 34 from the user terminal 5 to the satellite can provide enhanced performance and precision of power control. This approach assumes that, in general, the link fading is not the same for the uplink 31 from the gateway 6 to the satellite and for the uplink 34 from the user terminal 5 to the satellite. This assumption is generally correct, in that the fade depth will not be the same due to differences in frequency separation, geometry, and rain cell location between the uplink 31 and uplink 34. Furthermore, the fading of the gateway uplink 31 simultaneously affects all of the user terminals 5 coupled to same satellite. On the other hand, fading due to the user terminal uplink 34 to the satellite affects only that user terminal, and normally not any of the other user terminals or the gateway to satellite link 31, 32.

Figure 14:
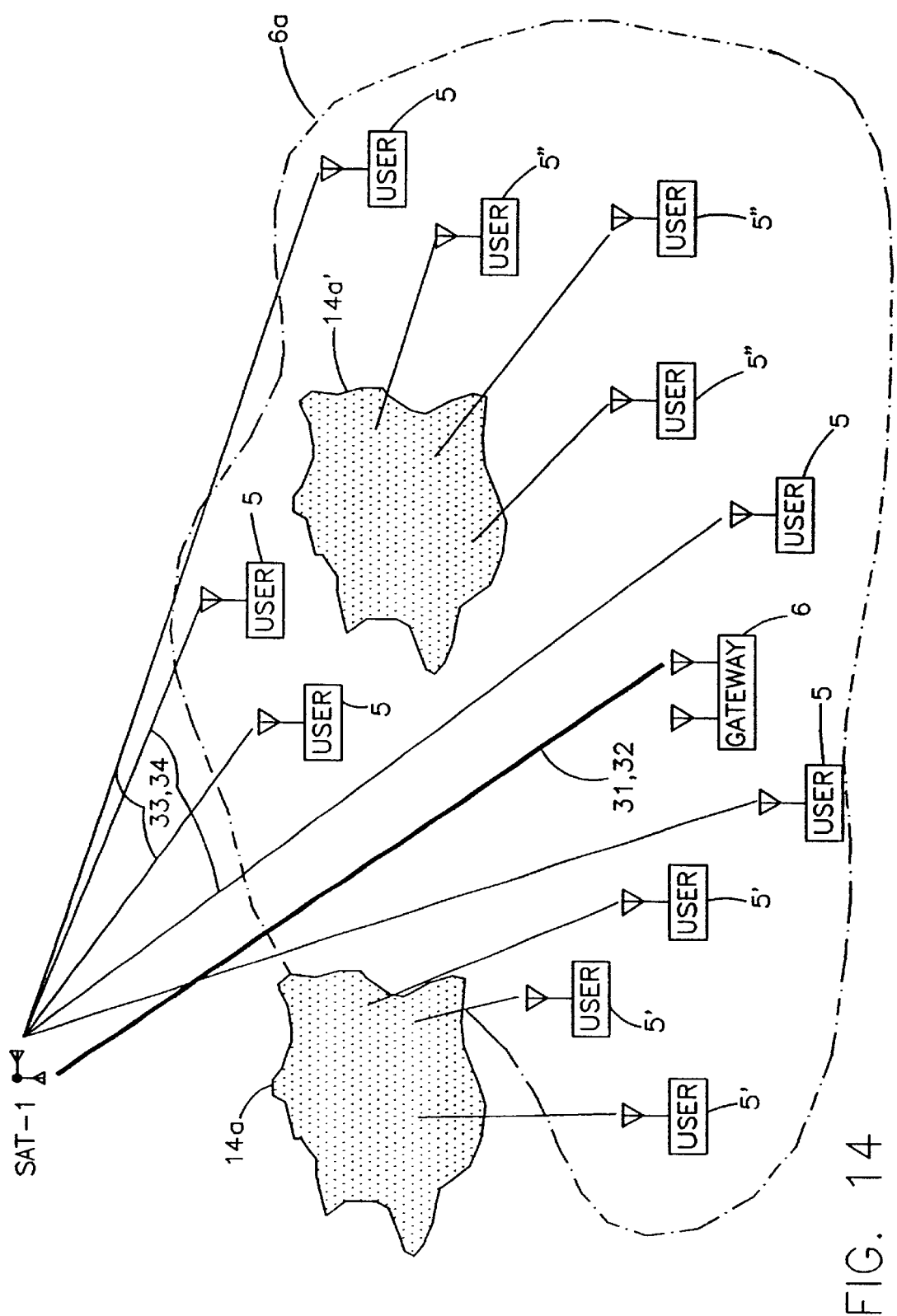
FIGS. 14–17 are useful in explaining an embodiment of this invention that employs user terminal signals for generating data for mapping and modelling weather-related attenuation-inducing structures, such as rain cells.

Reference in this regard can be had to FIG. 14, which assumes that there are many user terminals 5 dispersed over the coverage region 6a of the gateway 6. The user terminals 5 will access the satellite communication system 10 via many satellites at the same time, or may direct their signals via one or more satellites. In FIG. 14 it can be seen that some of the user terminal signals are faded by rain attenuation while others are not. By example, user terminals 5' are affected by rain cell 14, user terminals 5" are affected by rain cell 14a', while the remaining user terminal 5 links 33, 34 are not affected by these atmospheric sources of attenuation. Also in this example, the gateway link 31, 32 is not affected by the rain attenuation.

In accordance with an aspect of this invention a position location is performed by the gateway 6 on a user terminal 5 when the user terminal 5 requests service. As such, the locations of the various user terminals 5 in the service area 6 are known in latitude and longitude. Alternatively the location may be known on a call-by-call basis for a user which is portable within a service area. Also known is the satellite ephemeral information, as well as the location of the gateway 6. Therefore, it is possible to map the cloud formations and rain cells due to the attenuation observed on the user-satellite-gateway links, with the resultant fade depths and locations being mapped according to individual received signals from the satellites. Since the satellites and the attenuation are moving with respect to the relatively fixed user terminals 5 and gateway 6, a geometric map can be generated similar to that described above with respect to FIGS. 8–11. Likewise, control of the user terminal antenna 5d can be made in the same manner.

Figure 15A:
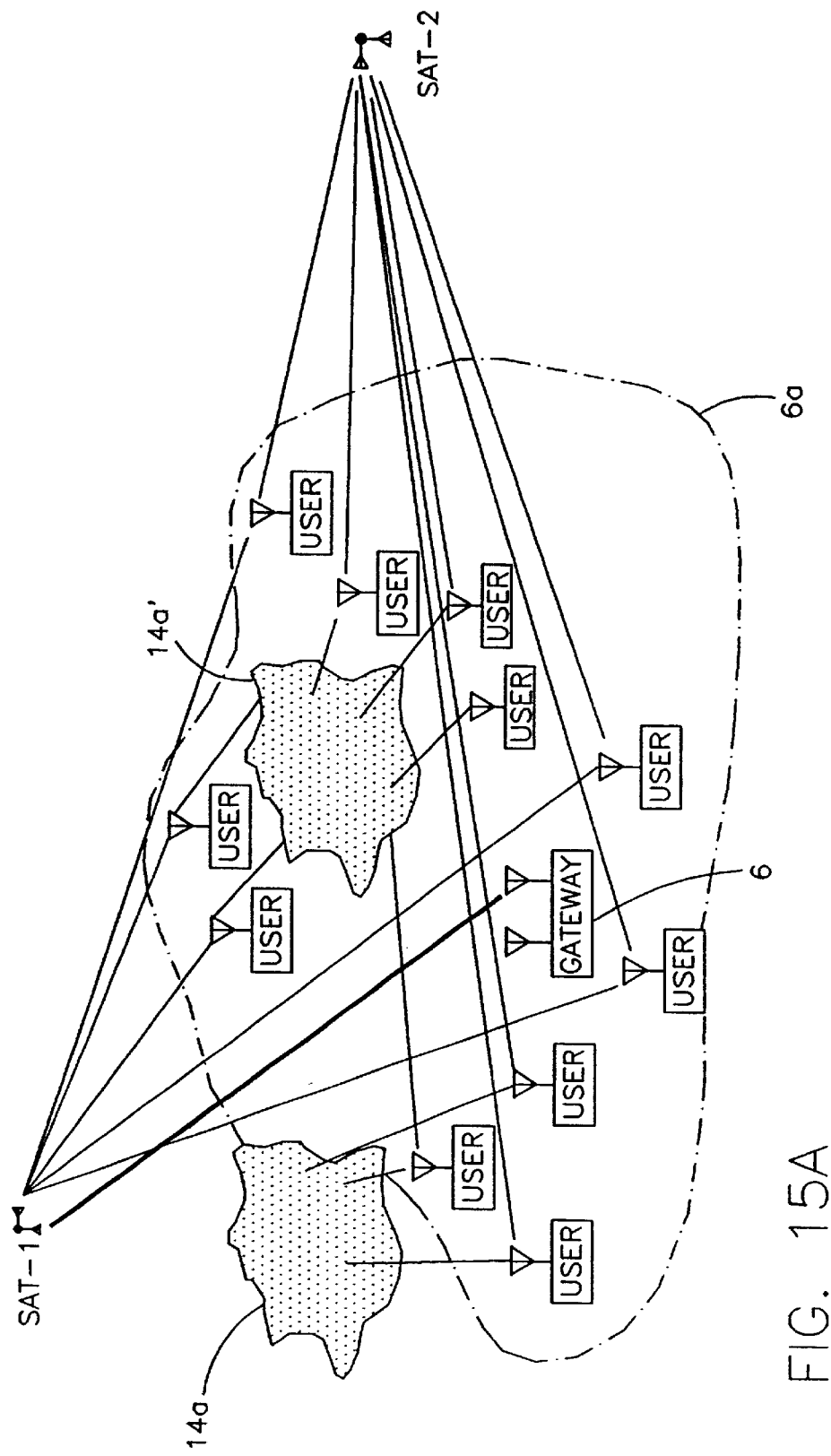
Figure 16C:
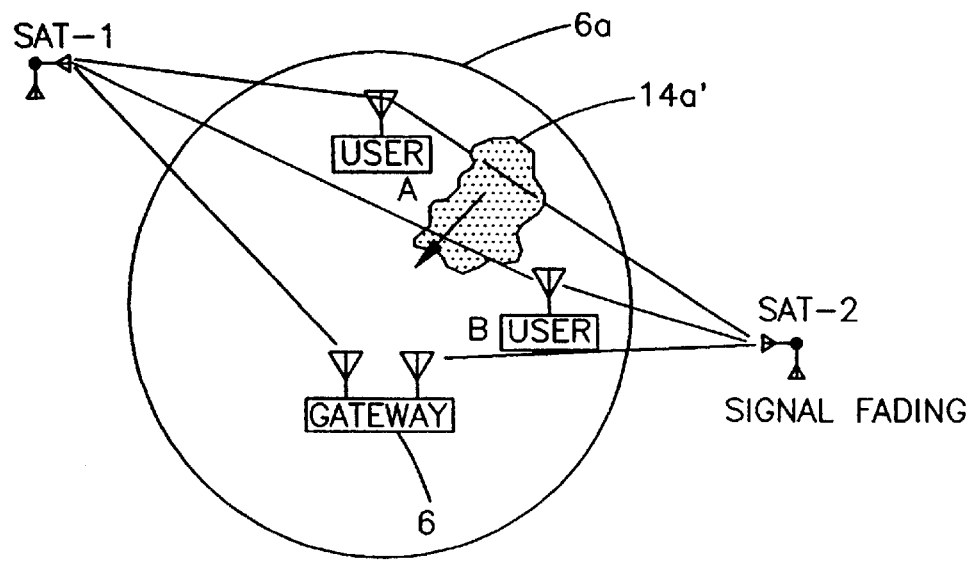
Figure 16D:
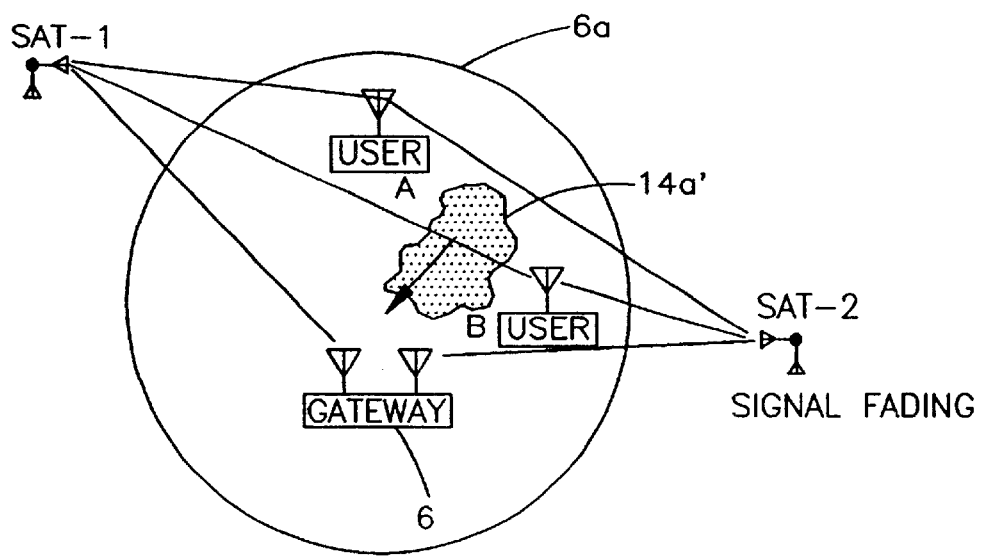

Furthermore, the constellation of satellites may be used to enhance the fade contour data. By example, reference is made to FIGS. 15A and 15B for showing a two satellite system that extends the geometry of FIG. 14. Since various user terminals 5 are simultaneously in clear view (or lesser, faded view) of some satellites, and are heavily faded with respect to other satellites, observing the overall fading pattern from the ensemble of user terminals 5 provides an enhanced view of the overall nature of the current fading phenomena.

By example, and referring to FIG. 15B, consider two user terminals A and B that are accessing the gateway 6. User terminal A is in a position such that its link 33, 34 is clear (non-attenuated) to Sat-1 and obscured (heavily attenuated) to Sat-2. User terminal B is in a position that its link 33, 34 is obscured to Sat-1 but clear to Sat-2. Of course, it may be the case that the link to the "clear" satellite may not be totally clear, but instead obscured to a lesser extent. Since all of the locations and overall geometry is known to the gateway 6, as well as the elevation angles to the satellites from the user terminals. A and B, a determination of the location of the rain cell 14a' or some other deep fade area can be calculated by the gateway 6.

Furthermore, and as is shown in FIGS. 16A–16D, by observing this fading phenomena over time (T1–T4) a history is developed much in the same manner as the description of the invention made above with respect to the MSACS 100 of FIG. 7. In FIGS. 16A–16D a historical record of the movement of the rain cell 14a' of FIG. 14 is made as the rain cell 14a' passes into and through the coverage area 6a of the gateway 6. Not only is the direction, speed, size and elevation of the rain cell 14a' determinable in this manner, but a fading profile or contour map, of a type shown in FIG. 10, can also be determined. The accuracy and resolution of the rain cell 14a' contour map, and of the overall rain cell model, is enhanced as a function of the numbers of user terminals 5 that are active in the coverage region 6a.

The system planning of resource allocation can be made based on only this model of the rain cell 14a', or this model can be used in conjunction with and/or as an accuracy check on the data received from the WRS 101 and/or the satellite-based weather information. Using this rain cell data the gateway 6 can issue instructions to the user terminals 5 as to transmitter power and/or preferred links, or the user terminals 5 can be instructed by information calculated onboard the satellites in the onboard processing case.

Figure 17:
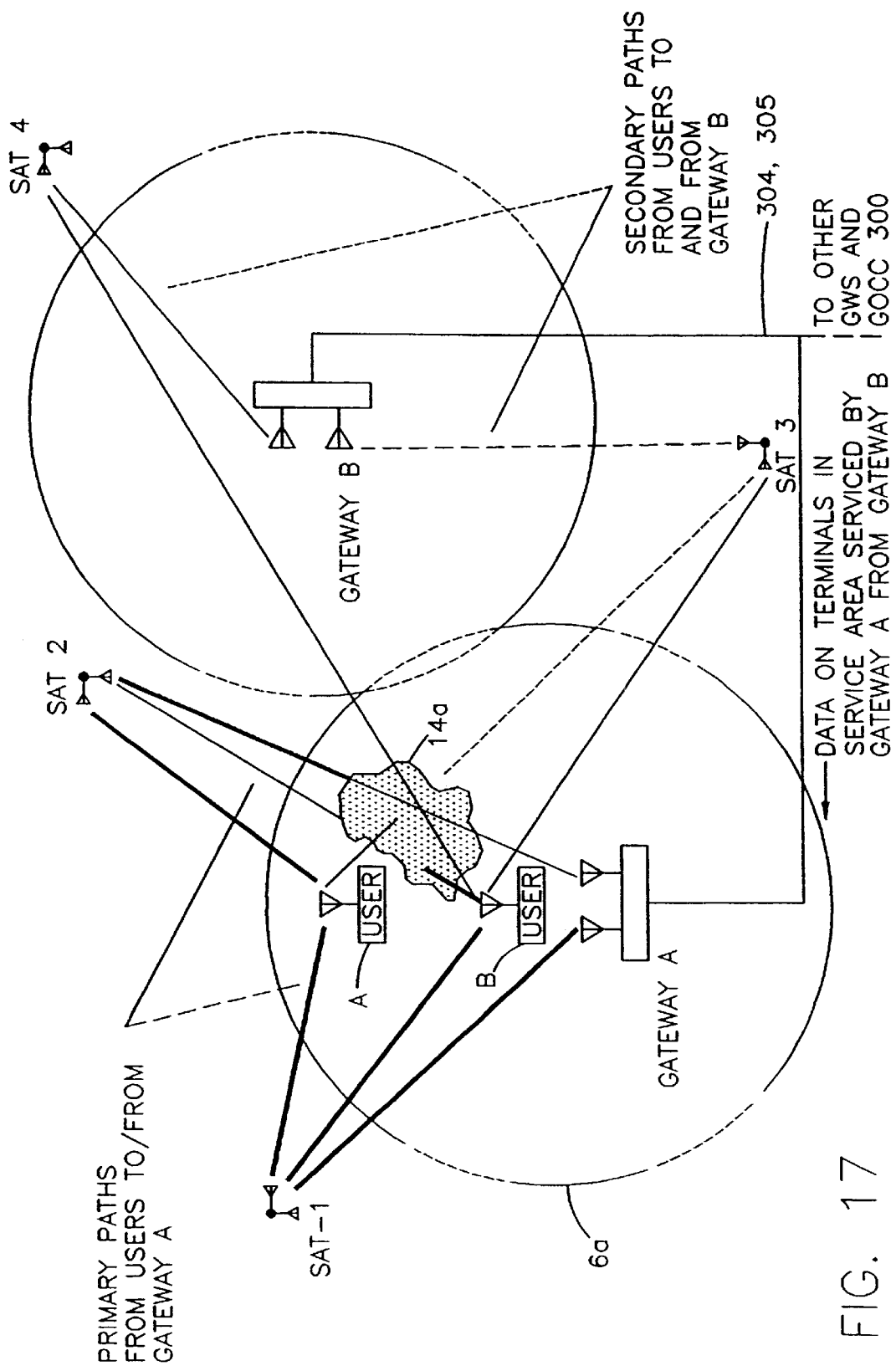

FIG. 17 illustrates an embodiment of this invention wherein there are multiple gateways operating such that user terminals can be linked to more than one gateway at a time via multiple satellites. This arrangement provides even further information on the location of the rain fades on both the user-to-satellite and the gateway-to-satellite links.

More particularly, FIG. 17 illustrates a method wherein the gateway-to-satellite link can be used to receive additional information and communicate this information to other gateways. By example, the gateway B provides secondary paths through Sat-3 and Sat-4 for user terminals A and B located in the service area 6a of gateway A. In this example the gateway A already is aware that the primary path between user terminal A and Sat-2 is clear, that the primary path between user terminal B and Sat-2 is faded, and that the paths between the gateway 6 and both user terminal A and User terminal B to Sat-1 are clear. The gateway B transmits additional information over the data network 304 to the gateway A (and optionally to the GOCC 300) as to the signal strengths of the secondary paths. By example, the gateway B will report that the secondary path is faded between user terminal A and Sat-3, and that the secondary path between user terminal B and Sat-3 is clear, but that the secondary path to Sat-4 is faded. Thus, gateway A obtains from gateway B additional information regarding the size, elevation, and fading contour of the rain cell 14a. Over a period of time the speed and direction of movement of the rain cell can also be determined. By example, assume that the rain cell 14a is moving in a direction generally towards the Sat-2 and is strengthening. In this case the gateway A may observe a relatively constant link attenuation for its link to Sat-2 and also for the primary link between user terminal B and Sat-2. However, after some minutes the gateway B will report that the secondary link between user terminal B and Sat-4 has experienced a reduction in fading as the rain cell 14a clears the line-of sight between user terminal B and Sat-4. It is clear that this additional information is valuable to the gateway A, and/or to the GOCC 300, in determining the characteristics of the rain cell 14a and in predicting the future effect of this rain cell on the communications within the gateway coverage area.

It should be noted that the embodiment of the invention shown in FIGS. 14–17 employs the user terminal signals directly for generating data for mapping and modeling the weather-related attenuation-inducing structures, such as the rain cells 14A. That is, this embodiment avoids the use of separate transmitters or beacons, such as conventional beacons located on the ground or on board the satellites.

In another application of this invention it is possible to separately account for signal propagation effects normally obscured by the combining of two effects, such as a signal which is being attenuated by rain. Consider two users operating on the same channel, with their signals orthogonally polarized linearly. That is to say, the first channel is on the vertical polarization and the second channel is on the horizontal polarization. It is important to maintain orthogonality so that the noise from the second channel into the first channel is minimized. In clear air this is maintained by the antenna design, which has a certain specified polarization 'purity'. However, if it is raining the signal is attenuated. Normally this attenuation is a combination of direct absorption by the rain drops, and an increase in noise in the channel that results from a depolarization of the polarized signal in the second channel on the same frequency. In accordance with as aspect of this invention it is possible to measure, at the gateway, the depolarization of signals caused by rain and to compare these measurements to previous clear sky measurements or to instantaneous measurements to a satellite in the clear. In this manner compensations can be made for the rain-induced depolarization, such as by adjusting the rotation of-antenna feed mechanisms, or by adjusting the phase and amplitude of the receive or transmit antennas, so as to compensate for the loss due to depolarization of the signal. Various combinations of propagation effects may be separated by the methods of this invention and compensated independently.

It is also within the scope of this invention to detect an increase in noise in one channel, such as by an increase in the symbol, word, or frame error rate due to leakage into that channel of signal energy from the orthogonal (depolarized) channel. This increase in noise may then be correlated with the amount of depolarization due to rain, and appropriate compensations made. Although described in the context of linearly polarized signals, it is also within the scope of the invention to employ circularly polarized RF signals.

As was pointed out above, all of the frequencies, bandwidths, and the like that are described and incorporated by reference herein are representative of but one particular system. Other frequencies and bands of frequencies may be used with no change in the principles being discussed. Furthermore, the teaching of this invention is not limited to only the disclosed numbers of satellites, elevation angles, altitudes, gateway antennas, and the like. By example, less than 48 satellites could be used in the LEO constellation 10, with a corresponding reduction in coverage.

Furthermore, and referring to FIG. 7, the WRS 101 need not be co-located with the gateway 6, but could be located at a remote location. In this case suitable transformations are made between the location of the WRS 101 and the location of the gateway to obtain the location of rain cells and the like relative to the gateway 6. Furthermore, and for a gateway that services a large geographic region, weather-related data from a plurality of WRSs 101 that are located within the gateway's coverage region can be inputted and processed by the gateway 6.

It should further be noted that the teaching of this invention is not limited for use only with radar-based or similar systems for obtaining weather-related data. By example, data from a space-based lighting flash sensor system, and/or a terrestrial-based wind shear sensor system, may be used to supplement the other weather-related data, assuming that the presence of lightning and/or wind shear are found to correlate with the presence of attenuation-inducing weather structures, such as rain cells.

Figure 18:
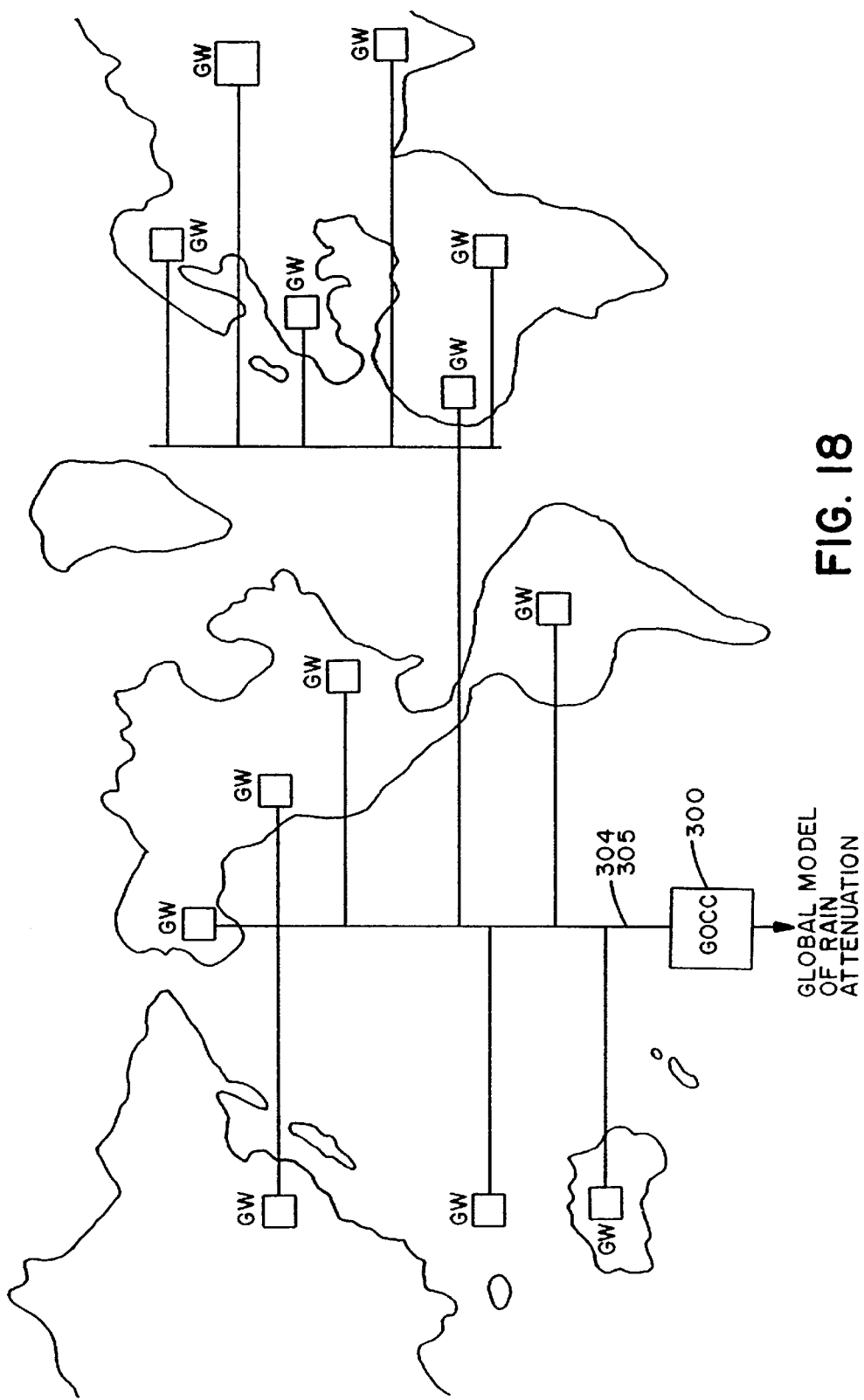
FIG. 18 illustrates the generation of a global model of rain attenuation in accordance with an aspect of this invention.

This invention can be used to develop a real-time or substantially real-time global model of RF signal attenuation, since the individual gateway (GW) information can be made available to the GOCC 300, as shown in FIG. 18, via the ground data network that includes data lines 304 and 305. A global model in this context implies that the model encompasses at least those regions of the earth wherein the majority of the earth's population resides.

Thus, while the invention has been particularly shown and described with respect to preferred embodiments thereof, it will be understood by those skilled in the art that changes in form and details may be made therein without departing from the scope and spirit of the invention.

What is claimed is:

1. A method for operating a satellite communications system of a type that includes at least one ground station, at least one satellite, and a plurality of user terminals, comprising the steps of:

generating in substantially real time a model of atmospheric-related, RF signal attenuation-inducing structures located within a coverage area of the ground station; and allocating at least one of ground station, satellite, and user terminal resources in accordance with the generated model.

2. A method as set forth in claim 1, wherein the step of generating a model includes an initial step of inputting atmospheric-related data from a radar system.

3. A method as set forth in claim 1, wherein the step of generating a model includes an initial step of inputting atmospheric-related data from a satellite observation system.

4. A method as set forth in claim 1, wherein the step of generating a model includes an initial step of generating atmospheric-related data from user terminal signals received by at least one of the ground station and another ground station.

5. A method as set forth in claim 1, wherein the step of generating a model includes a step of generating a three dimensional attenuation contour map of the structures, and a step of updating the contour map so as to reflect the evolution of the structures over time.

6. A method as set forth in claim 1, and further comprising a step of transmitting data indicative of the generated model to a ground station controller, wherein the ground station controller receives data indicative of the generated model from a plurality of ground stations, and wherein the ground station controller allocates satellite communications system resources at least in accordance with the received data.

7. A method as set forth in claim 1, and further comprising a step of transmitting data indicative of the atmospheric-related attenuation-inducing structures to a ground station controller, wherein the ground station controller receives such data from a plurality of ground stations, and wherein the ground station controller generates a global model of RF signal attenuation due to atmospheric effects.

8. A method for managing the power consumption in a satellite communications system of a type that includes at least one ground station, at least one satellite, and a plurality of user terminals, comprising the steps of:
inputting atmospheric-related data from at least one of a radar system and a satellite observation system;
generating in substantially real-time, from the atmospheric-related data, a model of RF signal attenuation-inducing structures located within a coverage area of the ground station; and
assigning at least one of communication links and link powers in accordance with the generated model.

9. A method as set forth in claim 8, wherein the step of generating a model includes an initial step of generating atmospheric-related data from user terminal signals received by at least one of the ground station and another ground station.

10. A method as set forth in claim 8, wherein the step of generating a model includes a step of generating a three dimensional attenuation contour map of the structures, and a step of updating the contour map so as to reflect the evolution of the structures over time.

11. A method as set forth in claim 8, and further comprising a step of transmitting data indicative of the generated model to a ground station controller, wherein the ground station controller receives data indicative of the generated model from a plurality of ground stations, and wherein the ground station controller preemptively allocates satellite communications system resources at least in accordance with the received data.

12. A method as set forth in claim 8, and further comprising a step of transmitting data indicative of the RF signal attenuation-inducing structures to a ground station controller, wherein the ground station controller receives such data from a plurality of ground stations, and wherein the ground station controller generates a global model of RF signal attenuation due to atmospheric effects.

13. A method for operating a satellite communications system of a type that includes a plurality of ground stations, a plurality of satellites, and a plurality of user terminals, comprising the steps of:
at a plurality of the gateways, generating a substantially real time model of atmospheric-related attenuation-inducing structures located within a coverage area of each of the gateways;
transmitting data indicative of the generated model from each of the plurality of gateways to a gateway controller; and
generating gateway commands at the gateway controller for preemptively allocating satellite communications system resources at least in accordance with the received data.

14. A method as set forth in claim 13, and further comprising a step of generating at the gateway controller a global model of RF signal attenuation due to atmospheric effects.

15. A satellite communications system having at least one ground station, at least one satellite, and a plurality of user terminals, said system further comprising a data processor in said ground station for generating a substantially real time model of atmospheric-related RF signal attenuation-inducing structures located within a coverage area of the ground station; said data processor being further operable for allocating at least one of ground station, satellite, and user terminal resources in accordance with the generated model.

16. A system as set forth in claim 15, wherein the ground station has an input coupled to an output of means for generating atmospheric-related data.

17. A system as set forth in claim 16, wherein said generating means generates the atmospheric-related data from user terminal signals received by at least one of the ground station and another ground station.

18. A system as set forth in claim 15, wherein said processor generates a three dimensional attenuation contour map of the structures.

19. A system as set forth in claim 15, and further comprising a ground station controller that is bidirectionally coupled to said ground station for receiving data indicative of the generated model, wherein said ground station controller receives data indicative of the generated model from a plurality of said ground stations, and wherein the ground station controller comprises control means for generating commands to said plurality of ground stations for allocating satellite communications system resources at least in accordance with the received data.

20. A system as set forth in claim 15, and further comprising a ground station controller that is bidirectionally coupled to said ground station for receiving data indicative of the atmospheric-related RF signal attenuation-inducing structures, wherein said ground station controller receives such data from a plurality of said ground stations, and wherein the ground station controller comprises a data processor for generating a global model of RF signal attenuation due to atmospheric effects.

21. A method for operating a satellite communications system of a type that includes at least one ground station, at least one satellite, and a plurality of user terminals, comprising the steps of:
generating a substantially real time model of atmospheric-related, RF signal attenuation-inducing structures located within a coverage area of the ground station;

determining from a user terminal attenuated RF signal received at the ground station, and in accordance with the generated model, a contribution to the attenuation due to at least two signal propagation effects; and separately compensating for the at least two effects.

22. A method as set forth in claim 21, wherein a first of the at least two effects is due to RF signal rain attenuation, and wherein a second of the at least two effects is due to RF signal depolarization.

23. A method for operating a satellite communications system of a type that includes at least one ground station, a plurality of satellites, and a plurality of user terminals, comprising the steps of:

generating in substantially real time a current model of atmospheric-related, RF signal impairments located within a coverage area of the ground station; and allocating at least one of ground station, satellite, and user terminal resources in accordance with the generated model so as to close a communication link between the ground station and a given one of the user terminals with a minimum amount of power consumption.

24. A method as set forth in claim 23, wherein a transmitted power level between the ground station and at least one of the plurality of satellites, and between the at least one of the satellites and the given one of the user terminals, is determined by the ground station.

25. A method as set forth in claim 23, wherein a transmitted power level between the ground station and at least one of the plurality of satellites is determined by the ground station, and wherein a transmitted power level between the at least one of the satellites and the given one of the user terminals is determined by the at least one of the satellites.

26. A method for operating a satellite communications system of a type that includes at least one terrestrial gateway, a plurality of non-geosynchronous orbit satellites that move with respect to a location of the gateway, and a plurality of user terminals located within a coverage area of the gateway, the gateway being bidirectionally coupled to one or more of the user terminals via RF links established through one or more of the satellites, comprising the steps of:

generating data that is descriptive of the presence of a rain cell within the coverage area of the gateway;

deriving from the generated data a three dimensional, substantially real time model of RF signal impairments due to the rain cell; and allocating system resources so as to compensate for the RF signal impairments as a function of at least a current location of RF signal impairments, a current location of at least one user terminal that is affected by the RF signal impairments, and a current location of one or more of the satellites relative to the current location of the RF signal impairments.

27. A method as in claim 26, wherein the step of generating data also generates an indication of movement of the rain cell, and wherein the step of allocating system resources is further a function of at least one of a predicted future location of the RF signal impairments, and a predicted future location of the one or more satellites.

28. A method as in claim 26, wherein the step of generating data includes a step of operating a radar system for detecting the presence of the rain cell.

29. A method as in claim 26, wherein the step of generating data includes a step of operating an imaging system for detecting the presence of the rain cell.

* * * * *